United States Patent
Yamamoto et al.

(10) Patent No.: US 7,101,088 B2
(45) Date of Patent: Sep. 5, 2006

(54) CYLINDRICAL ROLLER BEARING

(75) Inventors: Naota Yamamoto, Kuwana (JP); Mamoru Mizutani, Kuwana (JP)

(73) Assignee: NTN Corporation, Osaka-fu (JP)

( * ) Notice: Subject to any disclaimer, the term of this patent is extended or adjusted under 35 U.S.C. 154(b) by 81 days.

(21) Appl. No.: 10/952,714

(22) Filed: Sep. 28, 2004

(65) Prior Publication Data
US 2005/0069239 A1 Mar. 31, 2005

(30) Foreign Application Priority Data

| Sep. 30, 2003 | (JP) | ............................. 2003-340473 |
| Nov. 7, 2003 | (JP) | ............................. 2003-378487 |
| Nov. 25, 2003 | (JP) | ............................. 2003-394275 |
| Dec. 5, 2003 | (JP) | ............................. 2003-407416 |

(51) Int. Cl.
*F16C 33/66* (2006.01)
(52) U.S. Cl. .................................................. 384/470
(58) Field of Classification Search ................ 384/470, 384/572, 576, 580, 578
See application file for complete search history.

(56) References Cited

U.S. PATENT DOCUMENTS

2004/0081382 A1* 4/2004 Yokota ....................... 384/580

FOREIGN PATENT DOCUMENTS

| JP | 11-166544 | 6/1999 |
| WO | WO 03/029670 | 4/2003 |

* cited by examiner

Primary Examiner—Lenard A. Footland
(74) Attorney, Agent, or Firm—J.C. Patents

(57) ABSTRACT

A cage of a cylindrical roller bearing includes an annular section, a plurality of pillars that extend axially in an integrated, continuous manner from the inside surface of the annular section, and a plurality of pockets, which are formed between the inner circumferential direction side faces of adjacent pillars, and hold the cylindrical rollers in a freely rotatable manner. The circumferential direction side faces of the pillars incorporate a circular arc surface formed in both the inside and outside diameter directions from the pocket PCD which passes through the pocket center of the pocket, and a roll-off section (lubricant reservoir) provided at the tip end inner circumferential section.

24 Claims, 18 Drawing Sheets

CYLINDRICAL ROLLER BEARING

BACKGROUND OF THE INVENTION

1. Field of the Invention

The present invention relates to a cylindrical roller bearing comprising a cage made of a synthetic resin, and particularly to a cylindrical roller bearing used to support a rotating member that rotates at high speed, such as the main spindle in a machine tool.

2. Description of the Related Art

It is well known that in machine tools such as machining centers, CNC lathes, and milling machines, the main spindle is usually supported by a bearing in a freely rotatable manner relative to the housing. The orientation of this main spindle is divided into two broad categories, vertical (where the axis lies along the vertical) and horizontal (where the axis lies along the horizontal), depending on the type of machine. Furthermore, although dependent on the actual conditions of use, oil lubrication such as grease lubrication and air oil lubrication and the like are typically used as the lubricating method for the bearing which supports the spindle, and combined angular contact ball bearings or cylindrical roller bearings or the like are the most widely used types of bearing.

In this case, cylindrical roller bearings used to support the spindle of the machine tool typically comprise a cage, which holds a plurality of cylindrical rollers at predetermined intervals between an inner ring and an outer ring. Conventionally, cages machined from high strength cast brass have been the most widely used, but from the perspective of factors such as lubricant degradation due to abrasive powder produced by the cage during operation, and weight reduction, a move has recently begun toward cages made of a synthetic resin.

With this transition in technology, one known example of a synthetic resin cage that is currently in use within cylindrical roller bearings is the so-called comb type cage, as disclosed in Japanese Patent Laid-Open Publication No. Hei 11-166544 (referred to as patent reference 1 below) and International Patent Publication No. WO 03/029670 (referred to as patent reference 2 below). This comb type cage comprises a ring section, a plurality of pillars extending in one axial direction from the inside surface of the ring section, and a plurality of pockets formed between the surfaces on the circumferential direction side of pillars positioned adjacently in the circumferential direction, the pockets holding the cylindrical rollers in a freely rotatable manner. However, in a synthetic resin cage of this construction, because the tips of the pillars are free edges, the pillars undergo a comparatively large amount of outward elastic deformation due to the effect of centrifugal force generated during rotation, particularly at high rotation speeds, and the inner circumferential sections of these tips on the circumferential direction side faces can come into strong contact (abnormal contact) with the rolling contact surfaces of the cylindrical rollers, causing a deficiency of oil film between the contacting parts, which can generate abnormal abrasion or a rise in the bearing temperature.

In response to these problems, in the patent references 1 and 2, the circumferential direction side face $14b11$ of a pillar $14b$ that extends in the radial direction from an annular section $14a$ of a cage $14$ is divided into an outside diameter region and an inside diameter region, with the rolling element PCD that passes through the center O of a pocket $14c$ acting as the boundary, as shown in FIG. 23. The outside diameter region is formed as a circular arc surface (cylindrical surface) $14b11$ that follows the rolling contact surface of the cylindrical roller $13$, and the inside diameter region is formed as a straight surface $14b12$ along the entire radial length, in parallel with a radial line r1 that passes through the pocket center O, thereby preventing contact pressure from occurring in the radial direction between the inside diameter region $14b12$ of the circumferential direction side face $14b1$ of the pillar $14$ and the rolling contact surface of the cylindrical roller $13$ when the centrifugal force generated during rotation causes outward elastic deformation of the pillar $14b$.

Examples of essential properties required of a main spindle in a machine tool are the ability to undergo high speed rotation {normally where the dmn value (=pitch circle diameter of the rolling element (mm)×number of revolutions (rpm)) is at least 1,000,000} and that non repeatable run-out (NRRO) is minimal, and these characteristics are primarily determined by the axial bearing function of the bearing that supports the spindle. However, for the reasons described below, with the cylindrical roller bearings disclosed in the patent references 1 and 2, it is difficult to obtain the level of non repeatable run-out (NRRO) required for the main spindle of a machine tool.

In other words, in the cage $14$ of the cylindrical roller bearings disclosed in the patent references 1 and 2, as described above, the region of the circumferential direction side face $14b1$ of the pillar $14b$ from the rolling element PCD toward the inside diameter is formed as a straight surface $14b12$ along the entire radial length, meaning that contact pressure in the radial direction does not occur between the inside diameter region $14b12$ of the circumferential direction side face $14b1$ and the rolling contact surface of the cylindrical roller $13$ when the centrifugal force produced during rotation causes outward elastic deformation of the pillar $14b$. However, although this construction is effective in terms of preventing abnormal contact between the circumferential direction side face $14b1$ of the pillar $14b$ and the rolling contact surface of the cylindrical roller $13$, forming the inside diameter region of the circumferential direction side face $14b1$ of the pillar $14b$ as the straight surface $14b12$ described above has the result of promoting further outward elastic deformation of the pillar $14b$. In other words, by forming the inside diameter region of the circumferential direction side face $14b1$ of the pillar $14b$ as the straight surface $14b12$ described above, there are fewer locations where outward elastic deformation is restricted than in the normal pocket shape (in which the entire region of the circumferential direction side face of the pillar is formed as a circular arc surface that follows the rolling contact surface of the cylindrical roller). Furthermore, the circumferential direction wall thickness of the inside diameter region of the pillar $14b$ is also reduced, which lowers the rigidity of the pillar $14b$, resulting in the promotion of outward elastic deformation by the pillar $14b$.

FIG. 24 shows a schematic representation of a state where the pillars $14b$ of the cage $14$ of the cylindrical roller bearing disclosed in the patent references 1 and 2 have undergone outward elastic deformation due to the centrifugal force generated during high speed rotation (the solid lines), and a state prior to such deformation (the dashed lines). As shown in the figure, with the cage $14$ of the cylindrical roller bearing disclosed in the patent references 1 and 2, when the pillar $14b$ undergoes outward elastic deformation, the pocket gap g between the circumferential direction side face $14b1$ of the pillar $14b$ and the rolling contact surface of the cylindrical roller $13$ increases from the initial gap (the gap prior to deformation). Moreover, as a result of the promotion of further outward elastic deformation of the pillar 14*b* described above, the pocket gap g is further increased. An increase in this pocket gap g causes a reduction in the equalization capacity of the cylindrical roller and run-out of the center of revolution of the cylindrical roller, and non repeatable run-out occurs, leading to unstable shaking of the inner ring. In particular, with roller guiding cages, increasing the degree of freedom of the cage in the radial direction produces locations where the pocket gap g increases and locations where the pocket gap g shrinks, and the positions of these locations are not constant, which increases the degree of non repeatable run-out. This non repeatable run-out (NRRO) increases in proportion to the number of revolutions, and causes a variety of problems, including a deterioration in the machining accuracy of tools mounted to the main spindle of the machine tool.

FIG. 25 is a representative longitudinal cross-sectional view (FIG. 1 in the patent reference 1) showing the relative dimensional relationship between the annular section 14*a* and the pillar 14*b* of the cage 14, and the cylindrical roller 13 in the cylindrical roller bearing described in the patent references 1 and 2. As shown in FIG. 25, the length (thickness) Ta in the axial direction of the annular section 14*a* of the cage 14 is set to approximately 25% of the length Td in the axial direction of the cylindrical roller 13. In other words, as can be understood from the other diagrams in the patent references 1 and 2, in conventional synthetic resin cages, the dimensional relationship above was generally set to a value of approximately 25%. The reasons for such settings are because the relationship between the length Te in the axial direction of the inner ring 11 and the outer ring 12 and the length Td in the axial direction of the cylindrical roller 13, taking into consideration the function of the cylindrical roller bearing, is substantially the same value each time. If the design is based on this value and the characteristics of the resin material of the cage 14, then the length Ta in the axial direction of the annular section 14*a* of the cage 14 must naturally be set to approximately 25% of the length Td in the axial direction of the cylindrical roller 13.

However, while a cylindrical roller bearing according to this conventional design demonstrates adequate capabilities at low rotation speeds, at high rotation speeds there is a danger of elastic deformation of the pillars 14*b* of the cage 14 causing the bearing temperature to rise excessively. Furthermore, even when the method disclosed above in the patent references 1 and 2 is used, and a straight surface 14*b*12 is formed on the pillar 14*b* of the cage 14 with the conventional design described above, at high rotating speeds in excess of 13,000 rpm or thereabouts for example (or when the dmn value exceeds 1,650,000 or thereabouts), the bearing temperature may still rise excessively. It is fair to say that the cause of this phenomenon is the effect of centrifugal force causing the pillars 14*b* of the cage 14 to undergo a large amount of outward elastic deformation.

Furthermore, the inventors of the present invention have discovered, as a result of considering measures for preventing contact between the pillars 14*b* of the cage 14 and the cylindrical roller 13, that the phenomenon wherein the bearing temperature rises excessively at high rotational speeds due to elastic deformation of the pillars 14*b* depends largely on the length Ta in the axial direction of the annular section 14*a* of the cage 14. Accordingly, if the dimensional relationship between the length Ta in the axial direction of the annular section 14*a* of the cage 14 and the length Td in the axial direction of the cylindrical roller 13 is set as in conventional designs, there is a concern that this may greatly impede the ability to adequately reduce the elastic deformation of the pillars 14*b* caused by the effect of an extremely large amount of centrifugal force.

In addition, with such a cage 14 of a cylindrical roller bearing, if the pillars 14*b* are held such that they are in contact with the cylindrical roller 13, then the relationship between the two causes abrasion and the like due to contact resistance and sliding resistance, and to counter this, a film of a lubricant such as grease or air-oil is formed between the two. However, when a simple straight surface 14*b*12 is formed on the circumferential direction side face 14*b*1 of the pillar 14*b*, as in the cage 14 of the cylindrical roller bearing disclosed in the patent references 1 and 2, contact during rotation, and particularly contact or sliding during rotation over long periods of time, increases the probability of a deficiency of oil film occurring between the pillar 14*b* and the cylindrical roller 13, which inevitably leads to a deterioration in the lubrication properties. Despite this, the above patent references give no consideration to countermeasures for reliably preventing deterioration of the lubrication properties, and there is not even any indication or suggestion that the inventors were aware of such a problem. At present, an appropriate solution to this problem is still required.

SUMMARY OF THE INVENTION

The technical objects of the present invention, in relation to a cylindrical roller bearing comprising a so-called comb type cage made of a synthetic resin, are to prevent elastic deformation of the pillars during high speed rotation, to prevent abnormal contact between the tips of the pillars and the rolling contact surface of the cylindrical rollers which is caused by this elastic deformation, to prevent abnormal abrasion of the cage, and to suppress increases in the bearing temperature.

The present invention, developed in order to achieve these technical objects, provides a cylindrical roller bearing comprising an inner ring, an outer ring, a plurality of cylindrical rollers arranged between the inner ring and the outer ring in a freely rollable manner, and a cage made of a synthetic resin, in which the cage comprises an annular section, a plurality of pillars extending in one axial direction from an inside surface of the annular section, and a plurality of pockets, which are formed between circumferential direction side faces of the pillars positioned adjacently in a circumferential direction, and hold the cylindrical rollers in a freely rollable manner. In this construction, the circumferential direction side faces of the pillars of the cage comprise, at a base end inner circumferential section, a roller guide section, which is formed as a circular arc surface that follows the rolling contact surface of the cylindrical roller, and guides the rolling contact surface of the cylindrical roller when centrifugal force causes the pillar to undergo outward elastic deformation during rotation, and comprise, at the tip end inner circumferential section, a roll-off section, which is recessed farther toward the circumferential center of the pillar than the roller guide section, and prevents radial contact pressure from occurring with the rolling contact surface of the cylindrical roller when centrifugal force generated during rotation causes the pillar to undergo outward elastic deformation.

By employing such a construction, when the centrifugal force generated during rotation causes the pillar to undergo outward elastic deformation, the guide section, formed on the base end inner circumferential section of the circumferential direction side face of the pillar as a circular arc surface that follows the rolling contact surface of the cylindrical roller, is displaced in the direction of reducing the pocket gap between the guide section and the rolling contact surface of the cylindrical roller (that is, toward the outside), thus guiding the rolling contact surface of the cylindrical roller. As a result, good equalization capacity is ensured, and the non repeatable run-out (NRRO) during high speed rotation is reduced to an acceptable level. Because the amount of elastic deformation undergone by the pillar is less at the base end than at the tip end, even in a construction where the cylindrical rollers are guided by the roller guide sections of the base end inner circumferential sections, abnormal contact does not occur between the pillars and the rolling contact surfaces of the cylindrical rollers. On the other hand, because the tip end inner circumferential section of the pillar has a roll-off section which is recessed farther toward the circumferential center of the pillar than the roller guide section, the tip end inner circumferential section of the circumferential direction side face does not contact the rolling contact surface of the cylindrical roller, or even if such contact does occur, it is light enough so as not to apply contact pressure in the radial direction. Consequently, abnormal contact between the tip end inner circumferential section of the circumferential direction side face and the rolling contact surface of the cylindrical roller during high speed rotation can be avoided, meaning abnormal abrasion of the tip end inner circumferential section can be prevented, and increases in the bearing temperature can also be suppressed.

In addition, providing a roller guide section in the base end inner circumferential section of the circumferential direction side face increases the wall thickness in the circumferential direction of the base end inner circumferential section of the pillar, which improves the rigidity of the pillar. Consequently, the amount of elastic deformation of the pillars in both the outward direction and the circumferential direction, caused by either the centrifugal force generated during rotation or the load from the cylindrical rollers, is able to be reduced. This means that favorable equalization capacity of the cylindrical rollers is maintained.

In the above construction, the length in the axial direction of the roll-off section is preferably between 10 and 35% of the length of the cylindrical roller. Furthermore, a start position of the roll-off section in the radial direction is preferably set such that a line connecting the start position of the roll-off section in the radial direction and a center of the pocket forms an angle on the inside diameter side of 20 degrees or less relative to the tangent of the pocket PCD at the pocket center. By forming the roll-off sections according to these standards, the effects described above can be demonstrated at the high rotation speeds demanded of the main spindle in a machine tool.

Furthermore, the circumferential direction side face of the roll-off section is preferably formed as a straight surface that is parallel to a circumferential direction centerline of the pillar. When compared with the case where the circumferential direction side face of the roll-off section is a straight surface parallel to the radial line that passes through the pocket center, although the same effects are provided, the wall thickness in the circumferential direction of the tip end inner circumferential section of the pillar can be thicker in the construction of the present invention, which enables an improvement in the rigidity of the pillar.

Alternatively, the circumferential direction side face of the roll-off section may be formed as an inclined surface, inclined toward the circumferential direction centerline of the pillar. This enables abnormal contact between the tip end inner circumferential section of the circumferential direction side face of the pillar and the rolling contact surface of the cylindrical roller to be reliably avoided during high speed rotation.

In the present invention, although ideally a roll-off section is formed on each of the plurality of pillars of the cage, and particularly on both side faces in the circumferential direction of each of the pillars, roll-off sections may also be formed on every second, or every third or greater pillar, or alternatively, roll-off sections may also be formed on each pillar except every third or greater pillar.

In addition, the present invention is particularly suited to double row roller bearings where roller bearings are arranged in a plurality of rows. In this case, a construction is preferably used where each row of roller bearings is held individually by the aforementioned cage. The roller bearings are even more preferably arranged so that the annular sections of the cages which hold each row of roller bearings contact each other on the bearing center side.

Furthermore, the present invention, developed in order to achieve the technical objects described above, also provides a cylindrical roller bearing comprising an inner ring, an outer ring, a plurality of cylindrical rollers arranged between the inner ring and the outer ring in a freely rollable manner, and a cage made of a synthetic resin, in which the cage comprises an annular section, a plurality of pillars extending in one axial direction from an inside surface of the annular section, and a plurality of pockets, which are formed between circumferential direction side faces of the pillars positioned adjacently in a circumferential direction, and hold the cylindrical rollers in a freely rollable manner. In this construction, the length in the axial direction of the annular section of the cage is set to a value between 30 and 40% of the length in the axial direction of the cylindrical rollers.

By employing such a construction, because the length in the axial direction of the annular section which supports the pillars of the synthetic resin cage in a cantilevered manner is set to between 30 and 40% of the length in the axial direction of the cylindrical rollers, that is a value which is clearly larger than the approximately 25% which is the conventional dimensional ratio, the relative rigidity of the annular section with respect to the pillars is increased. Accordingly, because the pillars are supported by this annular section with relatively high rigidity, and the support rigidity is therefore improved, even when the pillars begin to undergo outward elastic deformation due to the centrifugal force generated during rotation, an unduly large amount of elastic deformation can be prevented from occurring at the base end of each pillar (the bottom of the pillar), and consequently, elastic deformation of the entire pillar can be suppressed. In this case, if the length in the axial direction of the annular section is less than 30% of the length in the axial direction of the cylindrical rollers, then the rigidity of the annular section, and therefore the support rigidity of the pillars provided by the annular section, tends to be insufficient, and particularly at high rotation speeds, the amount of outward elastic deformation of the pillars increases, leading to abnormal contact between the tip end inner circumferential sections of the pillars and the rolling contact surfaces of the cylindrical rollers. At the stage where, for example, the rotation speed exceeds 13,000 rpm or thereabouts (or when the dmn value exceeds 1,650,000 or thereabouts), this abnormal contact may cause abnormal abrasion of the cage or a sudden rise in the bearing temperature, and may also cause non repeatable run-out (NRRO). In contrast, if the length in the axial direction of the annular section exceeds 40% of the length in the axial direction of the cylindrical roller, then because the cylindrical rollers need to be repositioned in the axial direction relative to the inner ring and outer ring over an unreasonably long distance, fundamental construction problems arise, such as the axial length of the outer ring and the inner ring becoming overly short. In addition, when the dimensional relationship between the two lengths exceeds 40%, the length in the axial direction of the cylindrical roller is relatively short, causing a reduction in load capacity. Accordingly, by ensuring that the dimensional relationship falls within a range from 30 to 40%, such problems do not occur.

In the above construction, the length in the axial direction of the pillars of the cage is preferably set to a value between 65 and 75% of the length in the axial direction of the cylindrical rollers.

In other words, if the length in the axial direction of the pillars is less than 65% of the length in the axial direction of the cylindrical rollers, then the pillars may be incapable of adequately supporting the cylindrical rollers during rotation, and particularly during high speed rotation, and because an excessive amount of deviation occurs in the attitude of the pillars, even if elastic deformation of the pillars can be suppressed, the fundamental ability of the pillars to support the cylindrical rollers is impaired. In contrast, if the length in the axial direction of the pillars exceeds 75% of the length in the axial direction of the cylindrical rollers, then even if the length in the axial direction of the annular section is relatively long, as described above, so as to improve the rigidity and support rigidity of the pillars, there is a danger of the length in the axial direction of the pillars becoming too long to adequately suppress elastic deformation during high speed rotation. Accordingly, by setting the dimensional relationship between the two values to between 65 and 75%, not only do these problems not occur, but the aforementioned technical feature of setting the length in the axial direction of the annular section to between 30 and 40% of the length in the axial direction of the cylindrical roller has an even greater significance and effect.

Furthermore, in the above construction, a chamfered section is preferably formed on the outside in the axial direction of the raceway surface of the inner ring and/or outer ring along which the cylindrical roller rolls, and the entire area of the rolling contact surface of the cylindrical roller is situated axially inward from the position of the boundary between the raceway surface and the chamfered section.

In other words, when the length in the axial direction of the annular section of the cage is lengthened, as described above, it is necessary to position the cylindrical rollers outward in the axial direction by an equivalent amount. However, in such a case, if the chamfered section is formed radially outside the raceway surface of the inner ring and or outer ring, then there is a danger of the rolling contact surface of the cylindrical roller contacting the boundary between the raceway surface and the chamfered section when it spans the boundary. In such a case, if the cylindrical roller rolls while in the state where the rolling contact surface of that cylindrical roller spans the boundary between the raceway surface and the chamfered section, then localized stress (edge stress) from the boundary position acts on the rolling contact surface of the cylindrical roller, which impedes the fundamental function of the cylindrical roller bearing. However if, as in the present invention, the entire rolling contact surface of the cylindrical roller is provided radially inward from the boundary position between the raceway surface and the chamfered section, then such problems do not occur.

In such a construction, the chamfered section is preferably formed at an angle of inclination of between 10 and 30° relative to the cylindrical surface formed by the raceway surface.

In other words, if the angle of inclination of the chamfered section (the tapered surface) is less than 10°, then with NN type cylindrical roller bearings, because the entry diameter (called the lead in chamfer diameter) of the bearing side face will be small, the end faces of the cylindrical rollers tend to interfere with the side of the outer ring. It is difficult to carry out the assembly process smoothly (this also applies to NNU type cylindrical roller bearings). On the other hand, if the angle of inclination of the chamfer exceeds 30°, then during assembly of the cylindrical roller bearing, it becomes difficult to install the cylindrical rollers smoothly due to the large inclination of the chamfered section. Accordingly, if the angle of inclination of the chamfer is kept between 10° and 30°, such problems do not occur.

In the above construction, the circumferential direction side faces of the pillars of the cage preferably comprise, at the base end inner circumferential section, a roller guide section, which is formed as a circular arc surface that follows the rolling contact surface of the cylindrical roller, and guides the rolling contact surface of the cylindrical roller when centrifugal force causes the pillar to undergo outward elastic deformation during rotation, and comprise, at the tip end inner circumferential section, a roll-off section, which is recessed farther toward the circumferential center of the pillar than the roller guide section, and prevents radial contact pressure from occurring with the rolling contact surface of the cylindrical roller when centrifugal force generated during rotation causes the pillar to undergo outward elastic deformation.

By employing such a construction, when the centrifugal force generated during rotation causes the pillar to undergo outward elastic deformation, the guide section, which is formed on the base end inner circumferential section of the circumferential direction side face of the pillar as a circular arc surface that follows the rolling contact surface of the cylindrical roller, is displaced in the direction of reducing the pocket gap between the guide section and the rolling contact surface of the cylindrical roller (that is, toward the outside), thus guiding the rolling contact surfaces of the cylindrical roller. As a result, good equalization capacity is ensured, and the non repeatable run-out (NRRO) during high speed rotation is reduced to an acceptable level. Because the amount of elastic deformation undergone by the pillar is less at the base end than at the tip end, even in a construction where the cylindrical rollers are guided by the roller guide sections of the base end inner circumferential sections, abnormal contact does not occur between the pillars and the rolling contact surfaces of the cylindrical rollers. On the other hand, because the tip end inner circumferential section of the pillar has a roll-off section which is recessed farther toward the circumferential center of the pillar than the roller guide section, the tip end inner circumferential section of the circumferential direction side face does not contact the rolling contact surface of the cylindrical roller, or even if such contact does occur, it is light enough so as not to apply contact pressure in the radial direction. Consequently, abnormal contact between the tip end inner circumferential section of the circumferential direction side face and the rolling contact surface of the cylindrical roller during high speed rotation can be avoided, meaning abnormal abrasion of the tip end inner circumferential section can be prevented, and increases in the bearing temperature can also be suppressed.

In addition, providing a roller guide section in the tip end inner circumferential section of the circumferential direction side face increases the wall thickness in the circumferential direction of the tip end inner circumferential section of the pillar, which improves the rigidity of the pillar. Consequently, the amount of elastic deformation of the pillars in both the outward direction and the circumferential direction, caused by either the centrifugal force generated during rotation or the load from the cylindrical rollers, is able to be reduced. This means that the favorable equalization capacity of the cylindrical rollers is maintained.

In the above construction, the length in the axial direction of the roll-off section is preferably between 10 and 35% of the length in the axial direction of the cylindrical roller. Furthermore, the start position of the roll-off section in the radial direction is preferably set such that the line connecting the start position of the roll-off section in the radial direction and the center of the pocket forms an angle, on the inside diameter side, of 20 degrees or less relative to the tangent of the pocket PCD at the pocket center. By forming the roll-off sections according to these standards, the effects described above can be demonstrated at the high rotation speeds demanded of the main spindle in a machine tool.

Furthermore, the circumferential direction side face of the roll-off section is preferably formed as a straight surface that is parallel with the circumferential direction centerline of the pillar. When compared with the case where the circumferential direction side face of the roll-off section is a straight surface parallel to the radial line that passes through the pocket center, although the same effects are provided, the wall thickness in the circumferential direction of the tip end inner circumferential section of the pillar can be thicker in the construction of the present invention, which enables an improvement in the rigidity of the pillar.

Alternatively, the circumferential direction side face of the roll-off section may be formed as an inclined surface, inclined toward the circumferential direction centerline of the pillar. This enables abnormal contact between the tip end inner circumferential section of the circumferential direction side face of the pillar and the rolling contact surface of the cylindrical roller to be reliably avoided during high speed rotation, and also enhances the function the roll-off sections perform as a lubricant reservoirs.

In addition, the present invention is particularly suited to double row roller bearings where roller bearings are arranged in a plurality of rows. In this case, a construction is preferably used where each row of roller bearings is held individually by the aforementioned cage. The roller bearings are even more preferably arranged so that the annular sections of the cages which hold each row of roller bearings contact each other on the bearing center side.

Furthermore, the present invention, developed in order to achieve the technical objects described above, also provides a cylindrical roller bearing comprising an inner ring, an outer ring, a plurality of cylindrical rollers arranged between the inner ring and the outer ring in a freely rollable manner, and a cage made of a synthetic resin, in which the cage comprises an annular section, a plurality of pillars extending in one axial direction from an inside surface of the annular section, and a plurality of pockets, which are formed between circumferential direction side faces of the pillars positioned adjacently in a circumferential direction, and hold the cylindrical rollers in a freely rollable manner. In this construction, the circumferential direction side faces of the pillars of the cage comprise a circular arc surface that follows the rolling contact surface of the cylindrical roller, and the tip end inner circumferential sections of the circumferential direction side faces comprise a roll-off section for contact with the cylindrical roller during elastic deformation of the pillar caused by centrifugal force, and this roll-off section comprises a first lubricant reservoir. In this case, the first lubricant reservoir may comprise the entire region of the roll-off section, in which case the roll-off section may perform the function of the first lubricant reservoir, or alternatively, a portion (for example the portion including the outer circumferential edge of the roll-off section) of the roll-off section may function as the first lubricant reservoir.

By employing such a construction, the cylindrical roller rolls as guided by the circular arc surface formed on the circumferential direction side face of the pillar of the cage, and during this rolling action, even if the lubricant such as grease or oil which coats the cylindrical roller is scraped off by the circular arc surface of the pillar, for example, the lubricant is replenished from the first lubricant reservoir of the roll-off section formed on the pillar, and consequently, there is much less likelihood of poor lubrication between the pillars and the cylindrical rollers. By using such a construction on both side faces in the circumferential direction of each of a plurality of pillars, the lubricant can be adequately replenished, and satisfactory lubrication properties can be maintained over long periods. In addition, because satisfactory lubrication properties can be ensured in the same manner during high speed rotation, it is possible to prevent, to a large degree, problems such as seizing and the like caused by poor lubrication. Moreover, because this construction also fulfills the function of a roll-off section for contact of the pillars with the cylindrical rollers during elastic deformation of the pillars caused by centrifugal force, even when the pillars undergo outward elastic deformation due to centrifugal force generated during rotation, the tip end inner circumferential sections of the circumferential direction side faces do not contact the rolling contact surfaces of the cylindrical rollers, or even if such contact does occur, it is light enough so as not to apply contact pressure in the radial direction. Consequently, abnormal contact between the tip end inner circumferential sections of the circumferential direction side faces and the rolling contact surfaces of the cylindrical rollers during high speed rotation can be avoided, meaning abnormal abrasion of the tip end inner circumferential sections can be prevented, and increases in the bearing temperature can also be suppressed.

In addition, more specifically, a construction is preferably used in which the circumferential direction side faces of the pillars of the cage comprise, at the base end inner circumferential section, a roller guide section, which is formed as a circular arc surface that follows the rolling contact surface of the cylindrical roller, and guides the rolling contact surface of the cylindrical roller when centrifugal force causes the pillar to undergo outward elastic deformation during rotation, and comprise, at the tip end inner circumferential section, a roll-off section, which is recessed farther toward the circumferential center of the pillar than the roller guide section, and prevents radial contact pressure from occurring with the rolling contact surface of the cylindrical roller when centrifugal force generated during rotation causes the pillar to undergo outward elastic deformation, and in which the roll-off section has a first lubricant reservoir.

By employing such a construction, when the centrifugal force generated during rotation causes the pillar o undergo outward elastic deformation, the guide section, formed on the base end inner circumferential section of the circumferential direction side face of the pillar as a circular arc surface that follows the rolling contact surface of the cylindrical roller, is displaced in the direction of reducing the pocket gap between the guide section and the rolling contact surface of the cylindrical roller (that is, toward the outside), thus guiding the rolling contact surface of the cylindrical roller. As a result, good equalization capacity of the cylindrical rollers is ensured, and the non repeatable run-out (NRRO) during high speed rotation is reduced to an acceptable level. Because the amount of elastic deformation undergone by the pillar is less at the base end than at the tip end, even in a construction where the cylindrical rollers are guided by the roller guide sections of the base end inner circumferential sections, abnormal contact does not occur between the pillars and the rolling contact surfaces of the cylindrical rollers. On the other hand, because the tip end inner circumferential section of the pillar comprises a roll-off section (first lubricant reservoir) which is recessed farther toward the circumferential center of the pillar than the roller guide section, as described above, the tip end inner circumferential section of the circumferential direction side face does not contact the rolling contact surface of the cylindrical roller, or even if such contact does occur, it is light enough so as not to apply contact pressure in the radial direction.

Furthermore, providing a roller guide section in the base end inner circumferential section of the circumferential direction side face increases the wall thickness in the circumferential direction of the tip end inner circumferential section of the pillar, which improves the rigidity of the pillar. Consequently, the level of elastic deformation of the pillars in both the outward direction and the circumferential direction, caused by either the centrifugal force generated during rotation or the load from the cylindrical rollers, is able to be reduced. This means that favorable equalization capacity of the cylindrical rollers is maintained.

In the above construction, the length in the axial direction of the roll-off section (first lubricant reservoir) is preferably set to a value between 10 and 35% of the length of the cylindrical roller. Furthermore, the start position of the roll-off section in the radial direction is preferably set such that the line connecting the start position of the roll-off section in the radial direction and the center of the pocket forms an angle, on the inside diameter side, of 20 degrees or less relative to the tangent of the Docket PCD at the pocket center. By forming the roll-off sections according to these standards, the effects described above can be demonstrated at the high rotation speeds demanded of the main spindle in a machine tool.

Furthermore, the circumferential direction side face of the roll-off section (the first lubricant reservoir) preferably has a stepped section (forming a concave section) at the outer circumferential edge, the base end of which connects with a straight surface that is parallel to the circumferential center line of the pillar. By using such a construction, the functionality of the section as a roll-off section and a lubricant reservoir is maintained, while the wall thickness in the circumferential direction of the tip end inner circumferential section of the pillar can be suitably increased, and the rigidity of the pillar can be improved.

Alternatively, the bottom end of the stepped section of the outer circumferential edge of the circumferential direction side face of the roll-off section (the first lubricant reservoir) may be connected with an inclined surface which is inclined toward the circumferential direction centerline of the pillar. This enables abnormal contact between the tip end inner circumferential section of the circumferential direction side face of the pillar and the rolling contact surface of the cylindrical roller to be reliably avoided during high speed rotation.

The above construction preferably also comprises a second lubricant reservoir positioned on the outer circumferential side, apart from the roll-off section (the first lubricant reservoir section).

By employing such a construction, because lubricant reservoir sections are formed not at one, but at two locations on the circumferential direction side face of the pillar, if such a construction is used for both side faces in the circumferential direction in each of the plurality of pillars, then each pocket would have a total of four lubricant reservoir sections, and as a result, the replenishment of lubricant would be carried out even more efficiently. Moreover, because the first lubricant reservoir section is provided on the roll-off section for contact with the cylindrical roller during elastic deformation of the pillar due to centrifugal force, abnormal contact between the tip end inner circumferential section of the circumferential direction side face and the rolling contact surface of the cylindrical roller can be avoided efficiently during high speed rotation.

In the above construction, preferably the first lubricant reservoir section is formed to the inner circumferential side of the pocket PCD which passes through the center of the pocket, and the second lubricant reservoir is formed to the outer circumferential side of the pocket PCD.

By employing such a construction, the first lubricant reservoir and the second lubricant reservoir provided in the roll-off section are positioned in the circumferential direction side face at locations that enables each to fulfill its function appropriately. In other words, the first lubricant reservoir provided on the inside circumferential side of the pocket PCD fulfills the function of supplying or replenishing lubricant to the inner circumferential regions, in addition to functioning as a roll-off section, and the second lubricant reservoir provided on the outside circumferential side of the pocket PCD fulfills the function of selectively supplying or replenishing lubricant in the outer circumferential regions. Accordingly, the proper amount of lubricant can be supplied or replenished in an evenly balanced manner across the entire region of the circumferential direction side faces of the pillars.

In the above construction, the second lubricant reservoir section is preferably formed as a groove that extends in the axial direction.

In other words, while the second lubricant reservoir section may be formed as a groove extending in a direction orthogonal to the axial direction, such a construction would mean that the grease or the like could be easily discharged in the radial direction, which would reduce the retention properties of the lubricant reservoir. However if, as in the technical aspect described above, the second lubricant reservoir is formed as a groove in the axial direction, certain advantages arise in that sufficient strength can be ensured when centrifugal force causes the pillar to undergo elastic deformation, and lubricant can be supplied or replenished efficiently over a wide region in the axial direction of the pillar.

In such a construction, the second lubricant reservoir section is preferably formed in a straight line, from a part way across the axial direction of the pillar to the tip.

By employing such a construction, because the straight groove which forms the second lubricant reservoir does not extend as far as the axial direction base end section (the bottom) of the pillar, sufficiently high rigidity is maintained for those portions of the pillar which require it, making the pillar sufficiently resistant to elastic deformation, and enabling any deterioration in durability to be prevented.

Moreover, because the groove is straight, simpler processing, easier manufacturing, and better layout suitability can be achieved.

In such a construction, the second lubricant reservoir is preferably formed such that the groove length is set to a value between 40 and 60% of the length in the axial direction of the cylindrical roller, the groove depth is set to a value between 2 and 8% of the diameter of the cylindrical roller, and the groove width is set to a value between 10 and 15% of the diameter of the cylindrical roller.

In other words, if the groove length, groove depth and groove width of the second lubricant reservoir are within the ranges specified above, then the groove can be formed without unreasonably reducing the rigidity of the pillar, and the replenishment of lubricant can take place appropriately, thus enabling the lubrication properties to be improved, while sufficient durability is retained against elastic deformation.

In such a construction, the second lubricant reservoir is preferably formed so as to be inclined in the opposite direction to the direction of inclination of the pillars relative to the center axis that occurs when the pillars undergo outward elastic deformation due to centrifugal force.

By employing such a construction, when the centrifugal force generated during rotation causes the pillar to undergo outward elastic deformation, because the straight groove that forms the second lubricant reservoir is inclined in the opposite direction from the direction in which the pillar inclines during elastic deformation, as the angle of inclination of the pillar relative to the center axis increases as a result of elastic deformation, the angle of inclination of the straight groove decreases until the straight groove becomes parallel with the center axis, and the direction of this inclination is opposite to that of the pillar. In such a case, when the pillar undergoes elastic deformation, the tip end inclines toward the outer diameter to a greater degree than the base end. Consequently, it is possible to avoid the situation where the straight groove passes through the tip of the pillar (the straight groove opens at the tip of the pillar), wherein the centrifugal force would cause the lubricant to escape all at once from the tip of the straight groove, making it difficult to maintain lubrication over a long period of time.

In such a construction, the angle of inclination of the inclined straight groove of the second lubricant reservoir is preferably set to a value between 2 and 10 degrees.

In other words, if the angle of inclination of the groove is less than 2 degrees, then a slight elastic deformation of the pillar would cause the direction of inclination of the groove relative to the center axis to align with the direction of inclination of the pillar relative to the center axis, which then leads to the situation where the centrifugal force causes the lubricant to escape all at once from the groove. On the other hand, if the angle of inclination of the groove exceeds 10 degrees, then even if the pillar undergoes a large amount of elastic deformation, a variety of problems can arise, including difficulty in supplying or replenishing a sufficient quantity of lubricant from the groove, or difficulty in forming the groove and the roll-off section in the limited area available on the pillar. Accordingly, such problems are less likely to occur if the angle of inclination of the groove is set within a range from 2 to 10 degrees.

In such a construction, an outer circumferential edge of the first lubricant reservoir is preferably formed at an incline in the opposite direction to the direction of inclination of the pillars relative to the center axis that occurs when centrifugal force causes the pillars to undergo outward elastic deformation.

By employing such a construction, when the centrifugal force generated during rotation causes the pillar to undergo outward elastic deformation, because the outer circumferential edge of the first lubricant reservoir in the roll-off section (preferably a straight edge) is inclined in the opposite direction from the direction in which the pillar inclines during elastic deformation, as the angle of inclination of the pillar relative to the center axis increases as a result of elastic deformation, the angle of inclination of the outer circumferential edge of the first lubricant reservoir decreases until the outer circumferential edge becomes parallel with the center axis, and the direction of this inclination is opposite to that of the pillar. In such a case, when the pillar undergoes elastic deformation, the tip end inclines toward the outer diameter to a greater degree than the base end, and consequently, it is possible to avoid the situation where the outer circumferential edge of the first lubricant reservoir passes through the tip of the pillar, wherein the centrifugal force would cause the lubricant to escape all at once from the tip of the outer circumferential edge of the first lubricant reservoir, making it difficult to maintain lubrication over a long period of time.

In such a construction, the angle of inclination of the inclined straight outer circumferential edge of the first lubricant reservoir is preferably set to a value between 2 and 10 degrees.

In other words, if the angle of inclination of the outer circumferential edge of the first lubricant reservoir is less than 2 degrees, then a slight elastic deformation of the pillar would cause the direction of inclination of the outer circumferential edge relative to the center axis to align with the direction of inclination of the pillar relative to the center axis, which then leads to the situation where the centrifugal force causes the lubricant to escape all at once from that outer circumferential edge. On the other hand, if the angle of inclination of the outer circumferential edge exceeds 10 degrees, then even if the pillar undergoes a large amount of elastic deformation, a variety of problems can arise, including difficulty in supplying or replenishing a sufficient quantity of lubricant through that outer circumferential edge, or difficulty in forming the roll-off section containing the first lubricant reservoir and the second lubricant reservoir in the limited area available on the pillar. Accordingly, such problems are less likely to occur if the angle of inclination of the outer circumferential edge of the first lubricant reservoir is set within a range from 2 to 10 degrees.

In addition, the present invention is particularly suited to double row roller bearings where roller bearings are arranged in a plurality of rows. In this case, a construction is preferably used where each row of roller bearings is held individually by the aforementioned cage. The roller bearings are even more preferably arranged so that the annular sections of the cages which hold each row of roller bearings contact each other on the bearing center side.

With a cylindrical roller bearing according to the present invention described above, in a cylindrical roller bearing comprising a so-called comb type cage made of a synthetic resin, it is possible to prevent abnormal contact between the tip end inner circumferential sections of the pillars and the rolling contact surface of the cylindrical rollers during high speed rotation, thereby preventing abnormal abrasion of the cage, suppressing increases in the bearing temperature, and reducing non repeatable run-out (NRRO).

Furthermore, with the cylindrical roller bearing according to the present invention, because a roll-off section with a first lubricant reservoir is formed on the circumferential direction side faces of the pillars of the cage, even if the lubricant such as grease or oil which coats the cylindrical rollers is scraped off by the circular arc surface of the pillars during rolling of the rollers, for example, the lubricant is replenished from these first lubricant reservoirs of the roll-off sections formed on the pillars, and consequently there is much less likelihood of poor lubrication between the pillars and the cylindrical rollers. Because satisfactory lubrication properties can be ensured even during high speed rotation, it is possible to prevent, to a large degree, problems such as seizing and the like caused by poor lubrication.

In addition, with the cylindrical roller bearing according to the present invention, in a so-called comb type cylindrical roller bearing comprising a cage made of a synthetic resin, because the length in the axial direction of the annular section of the cage is set to between 30 and 40% of the length in the axial direction of the cylindrical rollers, the pillars are supported by an annular section with relatively high rigidity, meaning the support rigidity is improved, and even when the pillars begin to undergo outward elastic deformation due to the centrifugal force generated during rotation, an unduly large amount of elastic deformation can be prevented from occurring at the base end of each pillar, and consequently, elastic deformation of the entire pillar can be suppressed.

DETAILED DESCRIPTION OF THE PREFERRED EMBODIMENTS

Embodiments of the present invention are described below with reference to the drawings.

Figure 1:
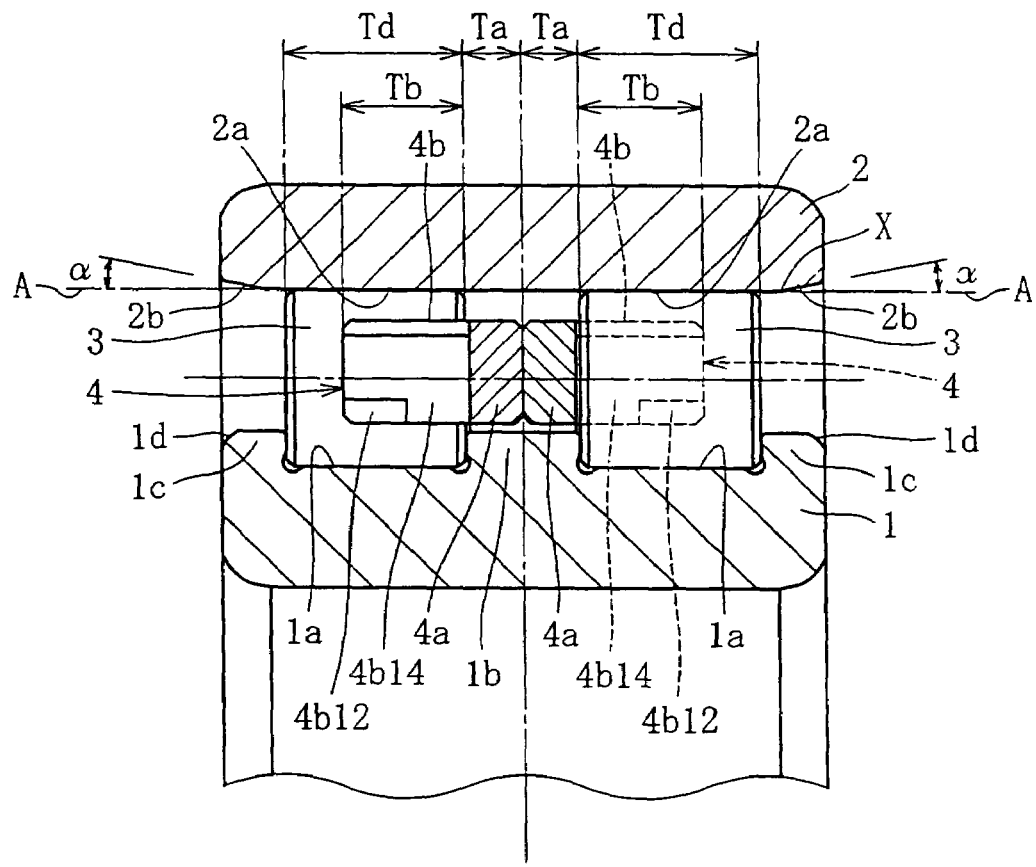
FIG. 1 is a cross-sectional view showing the main elements of a double row cylindrical roller bearing according to a first embodiment of the present invention.

FIG. 1 shows a double row roller bearing according to a first embodiment. In the spindle device of a machine tool, this double row roller bearing is a device that supports the spindle, which is driven rotationally at high speed, in a freely rotatable manner relative to the housing. The roller bearing comprises an inner ring 1 having a double row of raceway surfaces 1a, an outer ring 2 having a double row of raceway surfaces 2a, a double row of cylindrical rollers 3 disposed between the raceway surfaces 1a of the inner ring 1 and the raceway surfaces 2a of the outer ring 2 in a freely rollable manner, and a pair of cages 4 made of a synthetic resin which support each of the cylindrical rollers 3. A central flange 1b is provided at the center, in the axial direction, of the inner ring 1, and outer flanges 1c are provided at both ends.

Chamfered sections 2b are formed at both outside ends in the axial direction of the raceway surfaces 2a of the outer ring 2, and relatively smaller chamfered sections 1d are formed at both outside ends in the axial direction of the raceway surfaces 1a of the inner ring 1. In this case, the angle of inclination α of the chamfered sections 2b of the outer ring 2, that is, the angle of inclination α of the chamfered sections 2b relative to the cylindrical surface formed by the raceway surfaces 2a of the outer ring 2, is set to a value between 10 and 30°. Furthermore, the entire rolling contact surface of each cylindrical roller 3 is disposed axially inward from the boundary position X between the raceway surfaces 2a and the chamfered sections 2b of the outer ring 2. Furthermore, the inner ring 1 engages with the outer circumference of the spindle, and the outer ring 2 engages with the inner circumference of the housing. This double row roller bearing is lubricated by very small amounts of a lubricant such as air-oil or grease, and is often operated in a state where the inner radial gap is a negative value, that is a state where a preload is applied in the radial direction. The inside diameter surface of the inner ring 1 may be tapered, and accordingly, this inner ring 1 may be engaged with the outer circumferential surface of a spindle formed in a tapered shape, or the outer circumferential surface of a tapered sleeve fitted to the outer circumference of the spindle.

Figure 2:
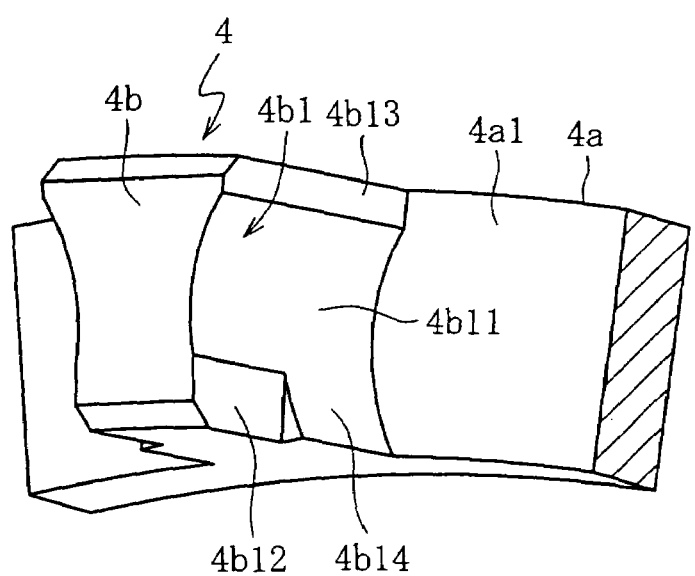
FIG. 2 is a perspective view showing the main elements of a cage according to the first embodiment of the present invention.

As shown in the enlarged views of FIG. 2 and FIG. 3, the cage 4 is formed by injection molding a self lubricating synthetic resin, such as polyether ether ketone resin (PEEK), polyamide resin (PA: PA66, PA46), or polyphenylene sulfide resin (PPS) (which may be blended with a predetermined amount of a filler such as carbon fiber (CF) or glass fiber (GF) where required). The cage 4 comprises an annular section 4a, a plurality of pillars 4b that extend axially in an integrated, continuous manner from the inside surface 4a1 of the annular section 4a, and a plurality of pockets 4c, which are formed between the inner circumferential direction side faces 4b1 of adjacent pillars 4b, and hold the cylindrical rollers 3 in a freely rollable manner. The plurality of pillars 4b are evenly spaced around the circumference. Each pocket 4c is enclosed on three sides by the inner circumferential direction side faces 4b1 of adjacent pillars 4b in the circumferential direction, and the inside surface 4a1 of the annular section 4a, and is open toward one axial direction.

Figure 3A:
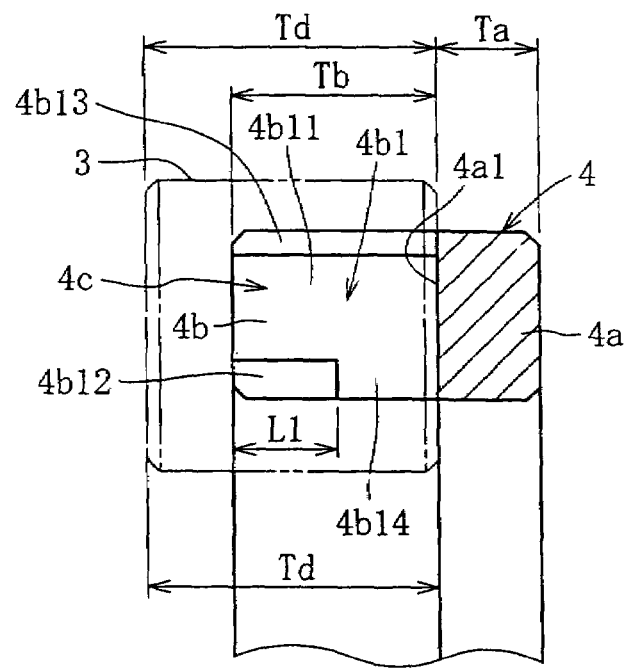
FIG. 3(a) is a cross-sectional view showing the main elements of the cage according to the first embodiment of the present invention.

In this case, as shown in FIG. 1 and FIG. 3(a), the length (thickness) Ta in the axial direction of the annular section 4a of the cage 4 is set to between 30 and 40% of the length Td in the axial direction of the cylindrical roller 3, and in this first embodiment, is set to 30%. Furthermore, the length Tb in the axial direction of the pillars 4b in the cage 4 is set to between 65 and 75% of the length Td in the axial direction of the cylindrical rollers 3, and in this first embodiment, is set to 70%.

Figure 3B:
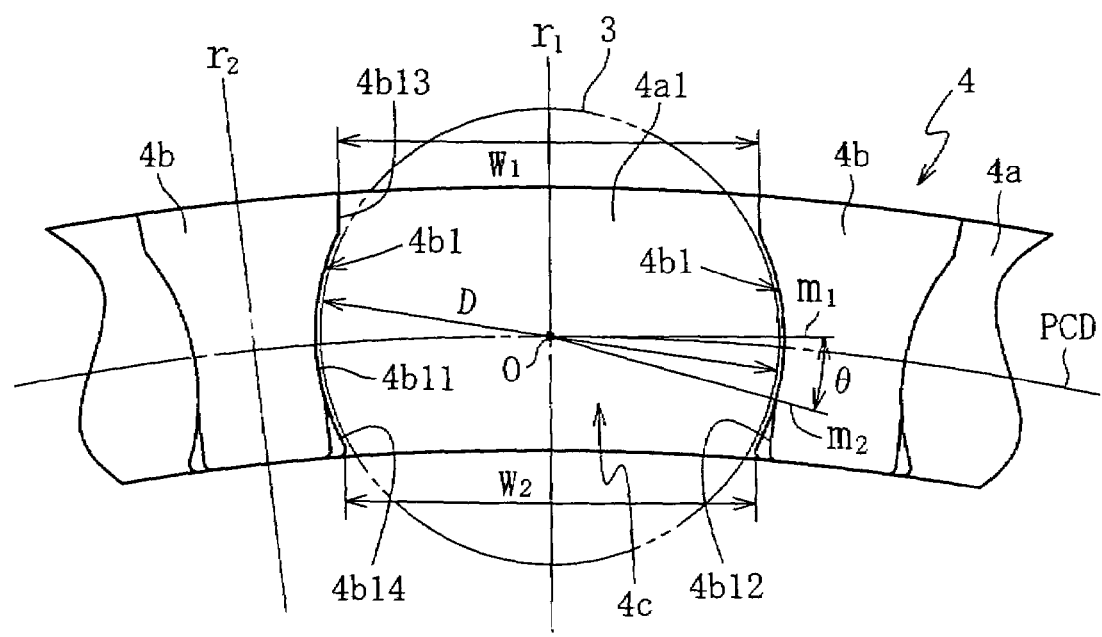
FIG. 3(b) is a partial side view of the cage, viewed from the tip end of a pillar.

On the other hand, as shown in FIGS. 3(a) and 3(b), the inner circumferential direction side faces 4b1 of the pillars 4b in the cage 4 comprise a circular arc surface (a cylindrical surface) 4b11 formed in both the inside and outside diameter directions from the pocket PCD which passes through the pocket center O of the pocket 4c (in the example in the drawings, the pocket PCD is equivalent to the PCD which passes through the center of the cylindrical roller 3), and a roll-off section 4b12 provided at the tip end inner circumferential section.

Specifically, the circular arc surface 4b11 of the pillar 4b is drawn as a circular arc about the pocket center O with a radius of between 1.005 and 1.1 times the radius (D/2) of the cylindrical roller 3, and the outside diameter end of this arc connects with a straight surface 4b13 which is parallel to the radial line r1 that passes through the pocket center O. The clearance W1 between opposing straight surfaces 4b13, which face each other in the circumferential direction, is less than the diameter D of the cylindrical roller 3, and as a result, travel of the cylindrical roller 3 from the pocket 4c toward the outside diameter is restricted. The inside diameter end of the circular arc surface 4b11 extends to the inside diameter end of the pillar 4b at the base end, and at the tip end, connects with the roll-off section 4b12 of the inner circumferential section. The minimum clearance W2 between base end inner circumferential sections 4b14 of opposing circular arc surfaces 4b11, which face each other in the circumferential section, is smaller than the diameter D of the cylindrical roller 3. The base end inner circumferential sections 4b14 act as a guide section which guides the rolling contact surface of the cylindrical roller 3 when the centrifugal force generated during rotation causes the pillar 4b to undergo outward elastic deformation.

The roll-off section 4b12 of the tip end inner circumferential section is formed from the tip of the pillar 4b, along the axial direction, to a point partway to the base end section, and has sufficient width to be recessed farther toward the circumferential direction center line r2 of the pillar 4b than the base end inner circumferential section 4b14. The length L1 in the axial direction of the roll-off section 4b12 is set to between 10 and 35% of the length Td in the axial direction of the cylindrical roller 3, and the start position of the roll-off section 4b12 in the radial direction is set to $\theta \leq 20°$ on the inside diameter side relative to the tangent m1 of the pocket PCD at the pocket center O. The angle $\theta$ is the angle formed between the line m2, which connects the start position of the roll-off section 4b12 in the radial direction with the pocket center O, and the tangent m1. Furthermore, the circumferential direction side face of the roll-off section 4b12 is formed as a straight surface that is parallel with the circumferential direction centerline r2 of the pillar 4b. Forming the roll-off section 4b12 in this manner creates a space which acts as a lubricant reservoir between the pillar and the rolling contact surface of the cylindrical roller 3 during low speed rotation, and even when centrifugal force during high speed rotation causes the pillar 4b to undergo outward elastic deformation along the circumferential direction centerline r2, there is still no contact between the pillar 4b and the rolling contact surface of the cylindrical roller 3. The minimum clearance between the circumferential direction side faces of opposing roll-off sections 4b12, which face each other in the circumferential direction, is slightly smaller than the diameter D of the cylindrical roller 3, but because the roll-off sections 4b12 are displaced toward the outside diameter along the circumferential direction centerline r2, no contact occurs with the rolling contact surface of the cylindrical roller 3. In this manner, by forming the circumferential direction side face of the roll-off section 4b12 as a straight surface that is parallel with the circumferential direction centerline r2, a thicker circumferential direction wall thickness can be obtained for the tip end inner circumferential section of the pillar 4b than in the case where the side face is formed as a straight surface parallel to the radial line r1, thereby improving the rigidity of the pillar 4b.

As shown in FIG. 1, in this first embodiment, the cage 4 is a rolling element guided cage, which rotates during bearing rotation with the inner circumferential direction side faces 4b1 of the pillars 4b guided while in contact with the rolling contact surface of the cylindrical rollers 3. When the rotation of the bearing reaches a predetermined speed, and centrifugal force causes the pillars 4b to undergo outward elastic deformation, the base end inner circumferential sections (the roller guide sections) 4b14 of the circumferential direction side faces 4b1 of the pillars 4b are displaced in a direction that reduces the pocket gap between the pillars 4b and the rolling contact surface of the cylindrical rollers 3 (that is, toward the outside diameter along the circumferential direction centerline r2) to guide the rolling contact surface of the cylindrical rollers 3. As a result, contact with the rolling contact surface of the cylindrical roller 3 is avoided, favorable equalization capacity of the cylindrical rollers 3 is ensured, and the non repeatable run-out (NRRO) during high speed rotation is reduced to an acceptable level.

Moreover, because the roll-off sections 4b12 are provided at the tip end side inner circumferential sections of the circumferential direction side faces 4b1 of the pillars 4b, contact with the rolling contact surface of the cylindrical rollers 3 is even more reliably avoided. As a result, abnormal abrasion of the tip end side inner circumferential section of the circumferential direction side faces 4b1 during high speed rotation is prevented, and increases in the bearing temperature can be suppressed.

Figure 4:
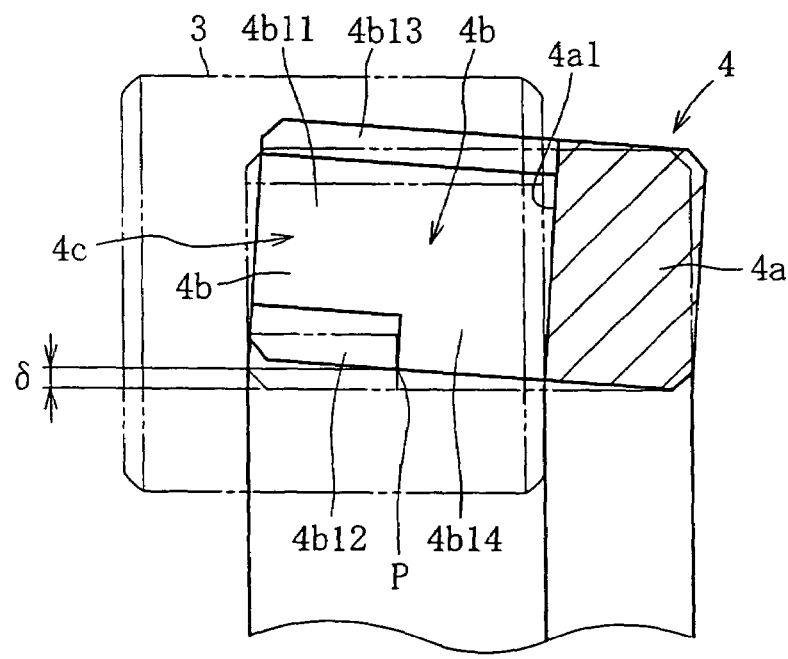
FIG. 4 is an outline cross-sectional view showing the action of the cage according to the first embodiment of the present invention.

In this case, the dimensional ratio of the length Ta in the axial direction of the annular section 4a relative to the length Td in the axial direction of the cylindrical rollers 3 is set to 30%, which is larger than the same dimensional ratio in conventional designs (which is approximately 25% or thereabouts). Consequently, the annular section 4a has a relatively increased thickness relative to the cylindrical rollers 3. Accordingly, the amount of outward elastic deformation δ of the tip end of the pillars 4b shown in FIG. 4 is reduced. Specifically, if this dimensional ratio is 30%, the rigidity of the annular section 4a, and thus the support rigidity of the annular section 4a for the pillars 4b, is increased, and therefore, even when the centrifugal force generated during high speed rotation causes the pillars 4b to undergo outward elastic deformation, the amount of elastic deformation δ of the tips of the pillars 4b is only small. As a result, contact with the rolling contact surface of the cylindrical roller 3 is even more reliably avoided, favorable equalization capacity of the cylindrical rollers 3 is ensured, and the non repeatable run-out (NRRO) during high speed rotation is reduced to an acceptable level.

Furthermore, because the length Tb in the axial direction of the pillar 4b is set to an appropriate length that is 70% of the length Td in the axial direction of the cylindrical roller 3, the problem that occurs when the length Td in the axial direction of the pillar 4b is too short, wherein the ability to hold the cylindrical roller 3 in a normal position is impeded, can be avoided, and the problem that occurs when the length Tb in the axial direction of the pillar 4b is too long, wherein it becomes difficult to reduce the amount of elastic deformation δ, can also be avoided. Consequently, the advantages obtained by setting the dimensional ratio of the length Ta in the radial direction of the annular section 4a relative to the length Td in the axial direction of the cylindrical roller 3 to 30%, as described above, can be obtained even more reliably.

In addition, forming the base end inner circumferential section (the roller guide section) 4b14 of the circumferential direction side face 4b1 as a circular arc surface that follows the rolling contact surface of the cylindrical roller 3 increases the wall thickness in the circumferential direction of the base end inner circumferential section 4b14 of the pillar 4b, which improves the rigidity of the pillar 4b. Consequently, the amount of elastic deformation of the pillar 4b in both the outward direction and the circumferential direction, caused by either the centrifugal force generated during rotation or the load from the cylindrical roller 3, is able to be reduced. This means that the favorable equalization capacity of the cylindrical rollers 3 is able to be maintained.

Furthermore, because the entire area of the rolling contact surface of the cylindrical roller 3 is provided radially inward from the boundary position X between the raceway surfaces 2a and the chamfered sections 2b of the outer ring 2, the situation that can arise where localized stress (edge stress) acts on the rolling contact surface of the cylindrical roller 3 due to contact occurring as a result of the rolling contact surface of the cylindrical roller 3 spanning and contacting the boundary position X, no longer occurs. Accordingly, there is no chance of the fundamental function of the cylindrical roller bearing being impeded. In this case, the boundary position X between the raceway surfaces 2a and the chamfered sections 2b must be set with due consideration given to the amount of relative movement in the axial direction of the inner and outer rings 1 and 2 caused by fitting errors and thermal expansion of the spindle.

In addition, because the chamfered sections 2b are inclined at an angle of between 10 and 30° relative to the cylindrical surface A formed by the raceway surfaces 2a, the cylindrical rollers 3 can be installed smoothly when assembling the cylindrical roller bearing.

Figure 5:
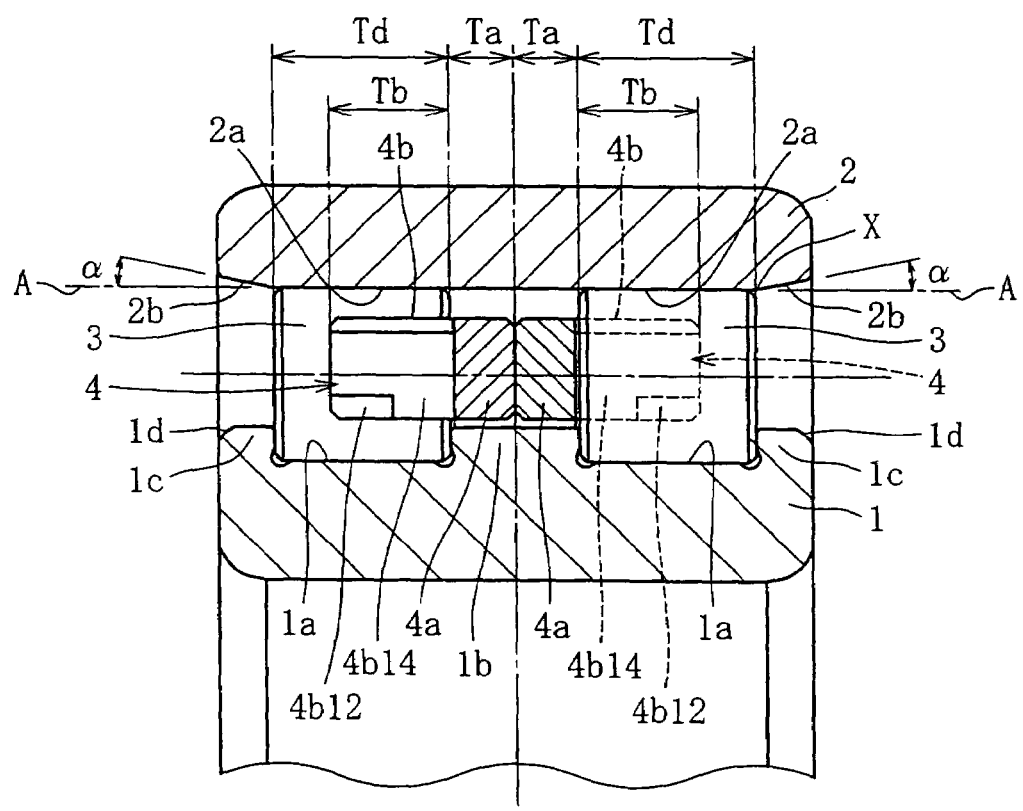
FIG. 5 is a cross-sectional view showing the main elements of a double row cylindrical roller bearing according to a second embodiment of the present invention.

In a cage 4 according to a second embodiment of the present invention shown in FIG. 5, the dimensional ratio of the length Ta in the axial direction of the annular section 4a relative to the length Td in the axial direction of the cylindrical roller 3 is set to 35%. The other structural elements and effects are as described in the first embodiment, and accordingly, those elements that are common to both embodiments are given the same reference numerals in FIG. 5, and those sections of the description which repeat are omitted.

Figure 6:
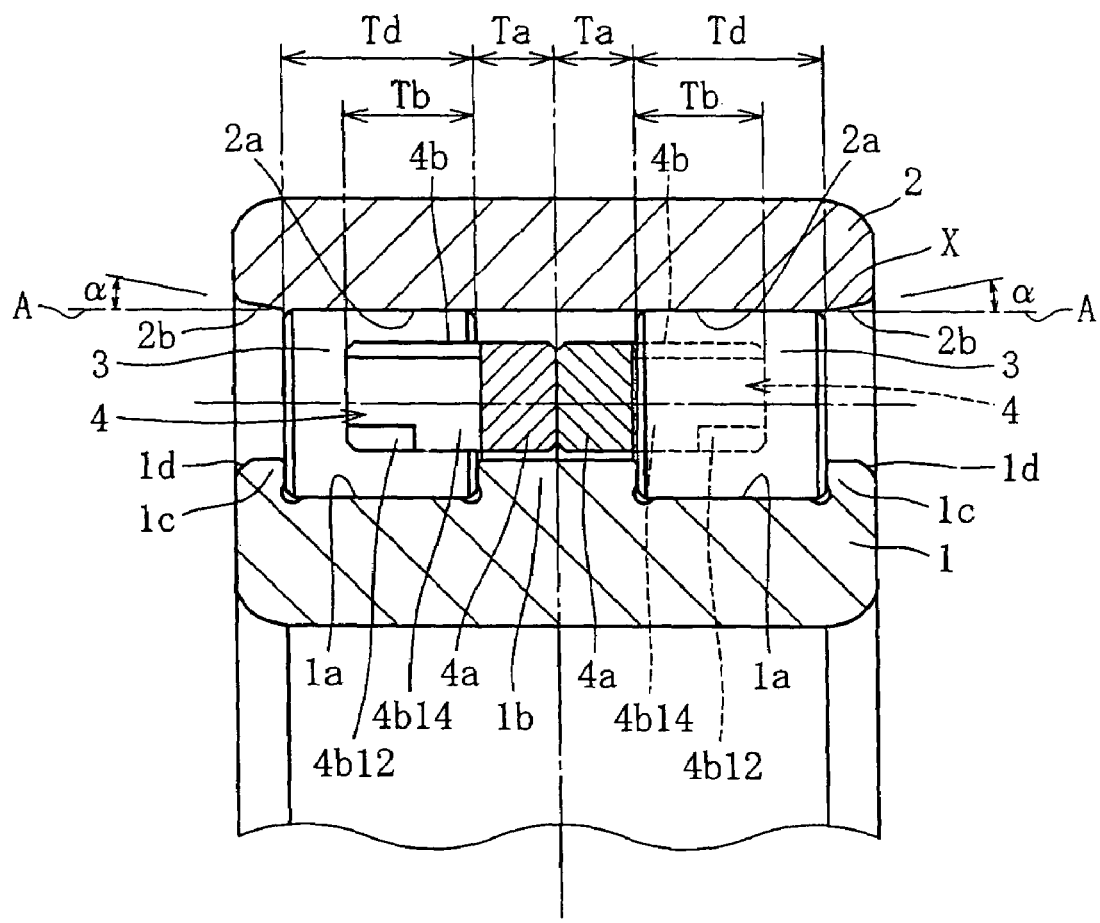
FIG. 6 is a cross-sectional view showing the main elements of a double row cylindrical roller bearing according to a third embodiment of the present invention.

In a cage 4 according to a third embodiment of the present invention shown in FIG. 6, the dimensional ratio of the length Ta in the axial direction of the annular section 4a relative to the length Td in the axial direction of the cylindrical roller 3 is set to 40%. The other structural elements and effects are as described in the first embodiment, and accordingly, those elements that are common to both embodiments are given the same reference numerals in FIG. 6, and those sections of the description which repeat are omitted.

Figure 7A:
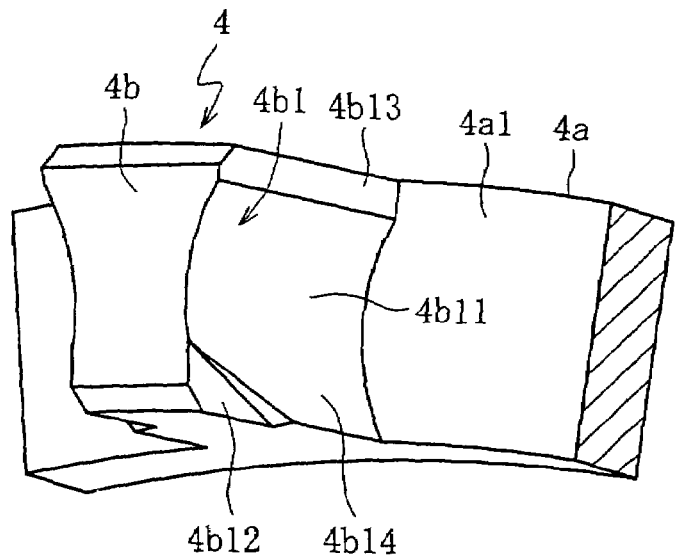
FIG. 7(a) is a perspective view showing the main elements of a cage according to a fourth embodiment of the present invention.
Figure 7B:
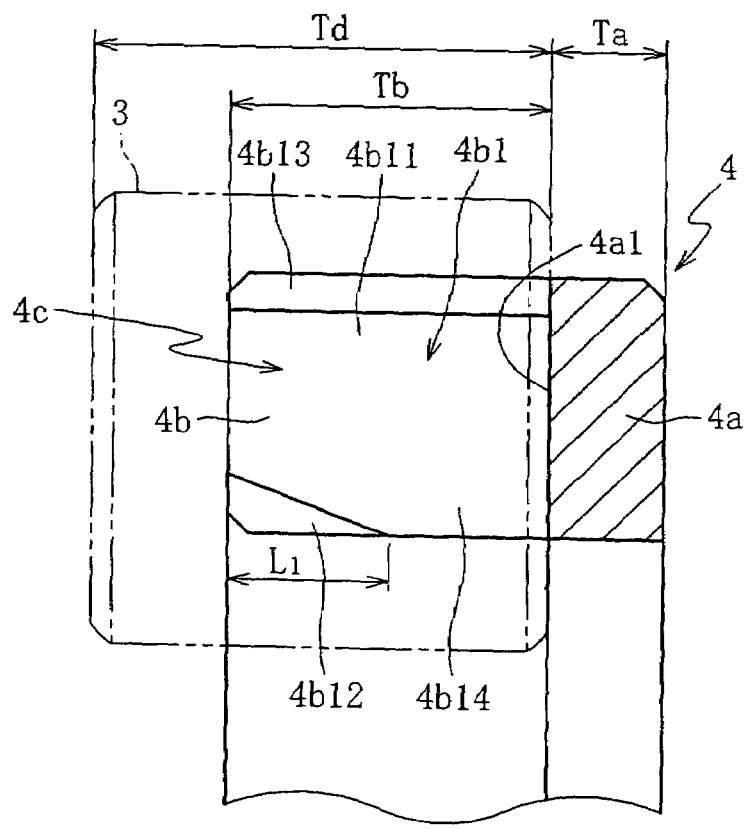
FIG. 7(b) is cross-sectional view showing the main elements of the cage.

In a cage 4 according to a fourth embodiment of the present invention shown in FIGS. 7(a) and 7(b), the roll-off sections 4b12 of the pillars 4b are formed such that the outside diameter end of each roll-off section is inclined toward the inside diameter from the tip end of the pillar 4b toward the base end. The other structural elements and effects are as described in the first embodiment, the second embodiment or the third embodiment, and accordingly, those elements that are common to more than one embodiment are given the same reference numerals in FIG. 7, and those sections of the description which repeat are omitted.

Figure 8:
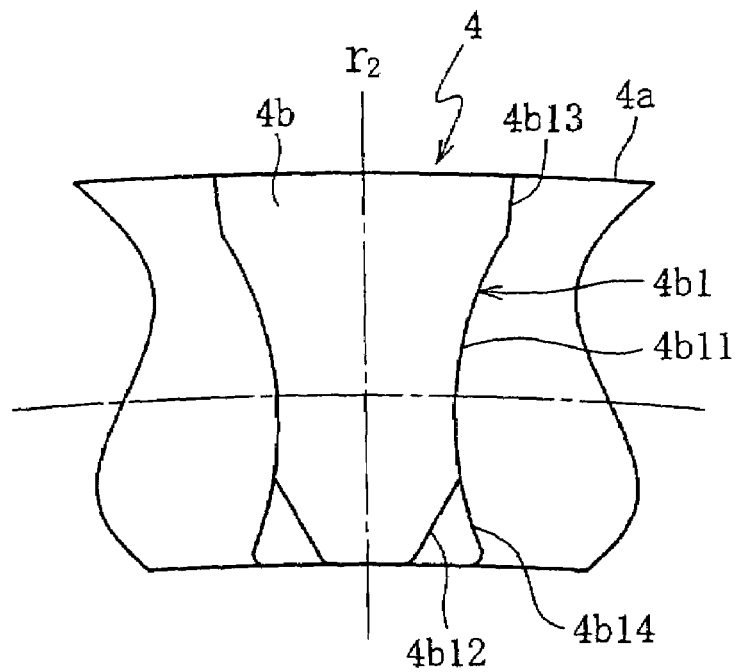
FIG. 8 is a partial side view of the cage of the fifth embodiment, viewed from the tip end of a pillar.

In a cage 4 according to a fifth embodiment of the present invention shown in FIG. 8, the roll-off sections 4b12 of the pillars 4b are formed such that the circumferential direction side face of each roll-off section is an inclined surface that is inclined toward the circumferential direction centerline r2. This fifth embodiment may be used in combination with the fourth embodiment. The other structural elements and effects are as described in the first embodiment, the second embodiment or the third embodiment, and accordingly, those elements that are common to more than one embodiment are given the same reference numerals in FIG. 8, and those sections of the description which repeat are omitted.

Figure 9:
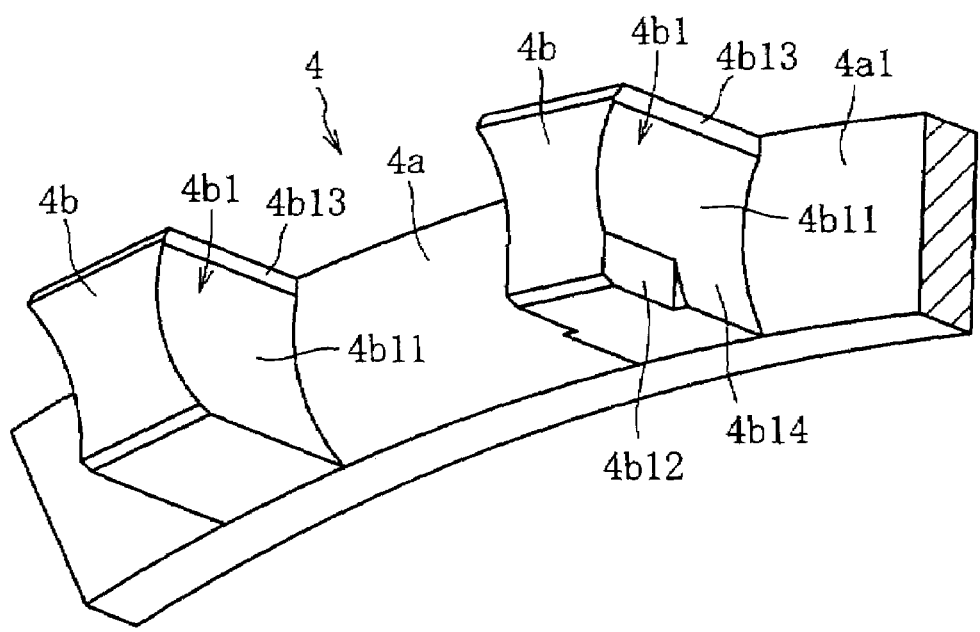
FIG. 9 is a partial perspective view of a cage according to a sixth embodiment of the present invention.

In a cage 4 according to a sixth embodiment of the present invention shown in FIG. 9, roll-off sections 4b12 are formed on both circumferential direction side faces 4b1 of every second or every third or greater pillar (in this embodiment, every second pillar) of a plurality of pillars 4b. This embodiment may be used in combination with the fourth or fifth embodiments. The other particulars are as described in the first embodiment, and those sections of the description which repeat are omitted. In this case, it goes without saying that the present invention in no way excludes the formation of roll-off sections 4b12 on both circumferential direction side faces 4b1 of every pillar 4b.

In the first through sixth embodiments described above, the guiding method of the cages is not limited to rolling element guiding, and outer ring guiding or inner ring guiding may also be used. In other words, the present invention does not specify any particular guiding method. Furthermore, in FIG. 1, FIG. 5, and FIG. 6, the example of an NN type double row cylindrical roller bearing is used, but the present invention can be applied in the same manner to both NNU type and other types of double row cylindrical roller bearings. In addition, the present invention is not limited to use in double row cylindrical roller bearings, and can be applied in the same manner to single row cylindrical roller bearings and multiple row cylindrical roller bearings.

[Test Results 1]

Figure 10:
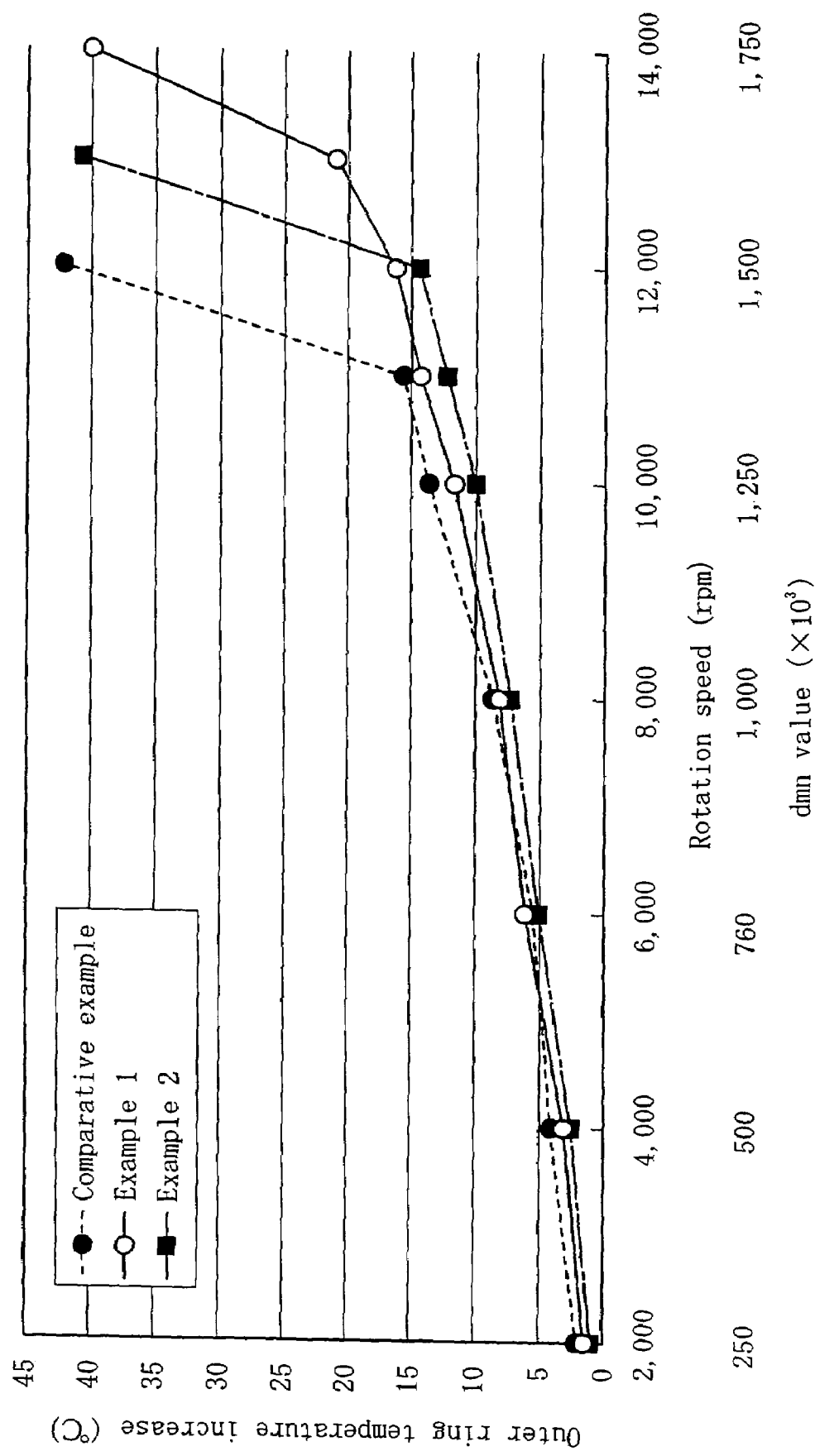
FIG. 10 shows test results 1.

A double row cylindrical roller bearing according to FIG. 1 which uses a cage 4 in which roll-off sections 4b12 are formed on both circumferential direction side faces 4b1 of every pillar 4b (example 1), a double row cylindrical roller bearing according to FIG. 1 which uses a cage 4 in which roll-off sections 4b12 are formed on both circumferential direction side faces 4b1 of every second pillar 4b (example 2), and a double row cylindrical roller bearing according to FIG. 1 which eliminates the roll-off sections 4b12 of the cage 4 and has the tip end inner circumferential sections formed with the same circular arc surface 4b11 as the other regions (comparative example) were prepared, and operated under air-oil lubrication, and the increase in temperature of the respective outer rings was compared. The results are shown in FIG. 10.

The test conditions were as follows:
Bearing model number: NN3020K
Cage material: Resin (PEEK+CF)
Inner radial gap after assembly: −5 μm
Cylindrical rollers: roller diameter ϕ 11 mm, roller length 11 mm, roller PCD ϕ 126 mm
Lubrication conditions: Air volume 30 NL/min, lubricant volume 0.02 ml/20 min, lubricating oil viscosity VG32, housing cooling provided As shown in FIG. 10, in rotation speed regions where the rotation speed of the bearing was no more than 8000 rpm (dmn=1,000,000), no large difference was observed in the increase in outer ring temperature between examples 1 and 2 and the comparative example. However, when the rotation speed of the bearing exceeded 8000 rpm (dmn=1,000,000), the increase in outer ring temperature was lower in the examples than in the comparative example, and when the rotation speed of the bearing exceeded 10,000 rpm (dmn=1,250,000), this difference in temperature increase was particularly marked. In other words, when the rotation speed of the bearing exceeded 8000 rpm (dmn=1,000,000), the increase in temperature of the outer rings of the examples 1 and 2 was comparatively low, and when the rotation speed of the bearing exceeded 10,000 rpm (dmn=1,250,000), the suppression effect on increases in the temperature of the outer ring was particularly marked. Furthermore, a comparison of the example 1 and the example 2 showed that although the temperature of the outer ring increased abruptly once the rotation speed of the bearing exceeded 12,000 rpm (dmn=1,500,000) in the example 2, in the example 1, the suppression effect on increases in the temperature of the outer ring was quite active even in high-speed regions.

[Test Results 2]

Figure 11:
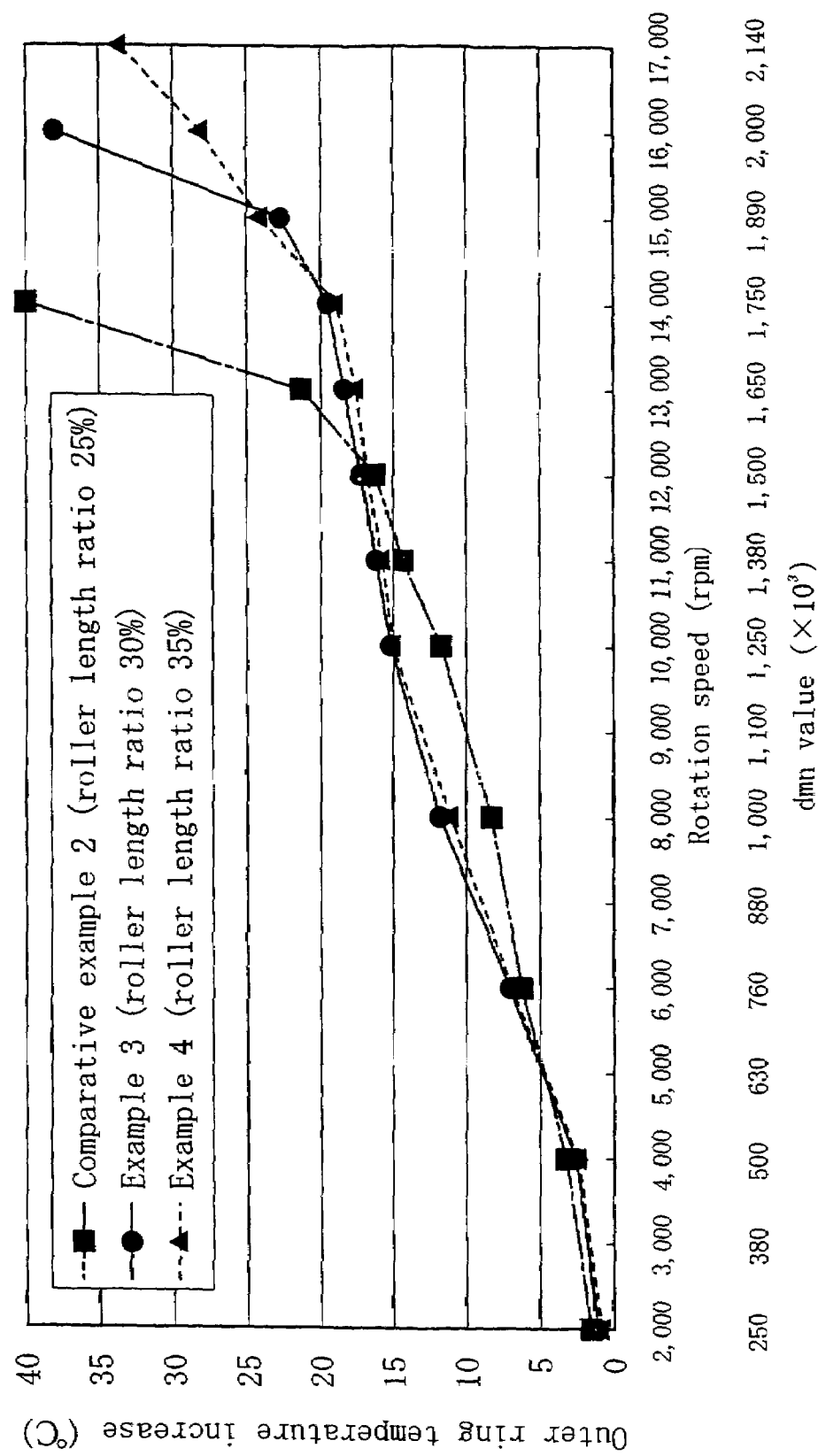
FIG. 11 shows test results 2.

A double row cylindrical roller bearing according to FIG. 1 in which the dimensional ratio of the length Ta in the axial direction of the annular section 4a relative to the length Td in the axial direction of the cylindrical roller 3 was 30% (example 3), a double row cylindrical roller bearing according to FIG. 5 in which the above dimensional relationship was 35% (example 4), and a conventional double row cylindrical roller bearing in which the above dimensional relationship was 25% (comparative example 2) were prepared, and operated under air-oil lubrication, and the increase in temperature of the respective outer rings was compared. The results are shown in FIG. 11.

The test conditions were as follows:
Bearing model number: NN3020K
Cage material: Resin
Internal radial gap after assembly: −5 μm
Cylindrical rollers: roller diameter ϕ 11 mm, roller length 11 mm, roller PCD ϕ 126 mm
Lubrication conditions: Air volume 30 NL/min, lubricant volume 0.02 ml/20 min, lubricating oil viscosity VG32, housing cooling provided As shown in FIG. 11, in rotation speed regions where the rotation speed of the bearing was no more than 6000 rpm (dmn=760,000), no significant difference was observed in the increase in temperature of the outer ring between the examples 3 and 4 and the comparative example 2. However, when the rotation speed was in the vicinity of 7000 rpm (dmn=880,000) to 11,000 rpm (dmn=1,380,000), a slight difference appeared in the level of increase in the outer ring temperature between the examples 3 and 4 and the comparative example 2, and when the rotation speed of the bearing exceeded 13,000 rpm (dmn=1,650,000), this difference between the examples 3 and 4 and the comparative example was particularly marked. In other words, in the examples 3 and 4, even when the rotation speed of the bearing exceeds 13,000 rpm (dmn=1,650,000), the increase in the outer ring temperature follows substantially the same gradient as that observed in lower rotation speed regions, but in contrast, in the comparative example 2, at the point where the rotation speed of the bearing exceeded 13,000 rpm (dmn=1,650,000), the temperature of the outer ring increased rapidly. From these results, it was concluded that the bearing of the comparative example 2 may not be able to be used properly in high rotation speed regions. A comparison of the example 3 and the example 4 showed that in the example 4, even when the rotation speed of the bearing exceeded 15,000 rpm (dmn=1,890,000), the level of increase in the outer ring temperature followed substantially the same gradient as that observed in lower rotation speed regions, but in contrast, in the example 3, at the point where the rotation speed of the bearing exceeded 15,000 rpm (dmn=1,890,000), the temperature of the outer ring increased rapidly. Accordingly, the example 4 can be used with favorable results at even higher rotation speed regions than the example 3.

In addition, FEM analysis was performed on the double row cylindrical roller bearing according to FIG. 1 in which the dimensional ratio of the length Ta in the axial direction of the annular section 4a relative to the length Td in the axial direction of the cylindrical roller 3 was 30% (the example 3), the double row cylindrical roller bearing according to FIG. 5 in which the above dimensional relationship was 35% (the example 4), the conventional double row cylindrical roller bearing in which the above dimensional relationship was 25% (the comparative example 2), a double row cylindrical roller bearing in which the above dimensional relationship was 15% (comparative example 3), and a double row cylindrical roller bearing in which the above dimensional relationship was 45% (comparative example 4), and the ratio of the cylindrical roller diameter relative to the amount of outward deformation δ of a point P shown in FIG. 4, which represents the end position of the base end of the first lubricant reservoir 4*b*12 of the pillar 4*b*, was determined for each cylindrical roller bearing, and the results were compared. The results of this comparison are shown in FIG. 12.

Figure 12:
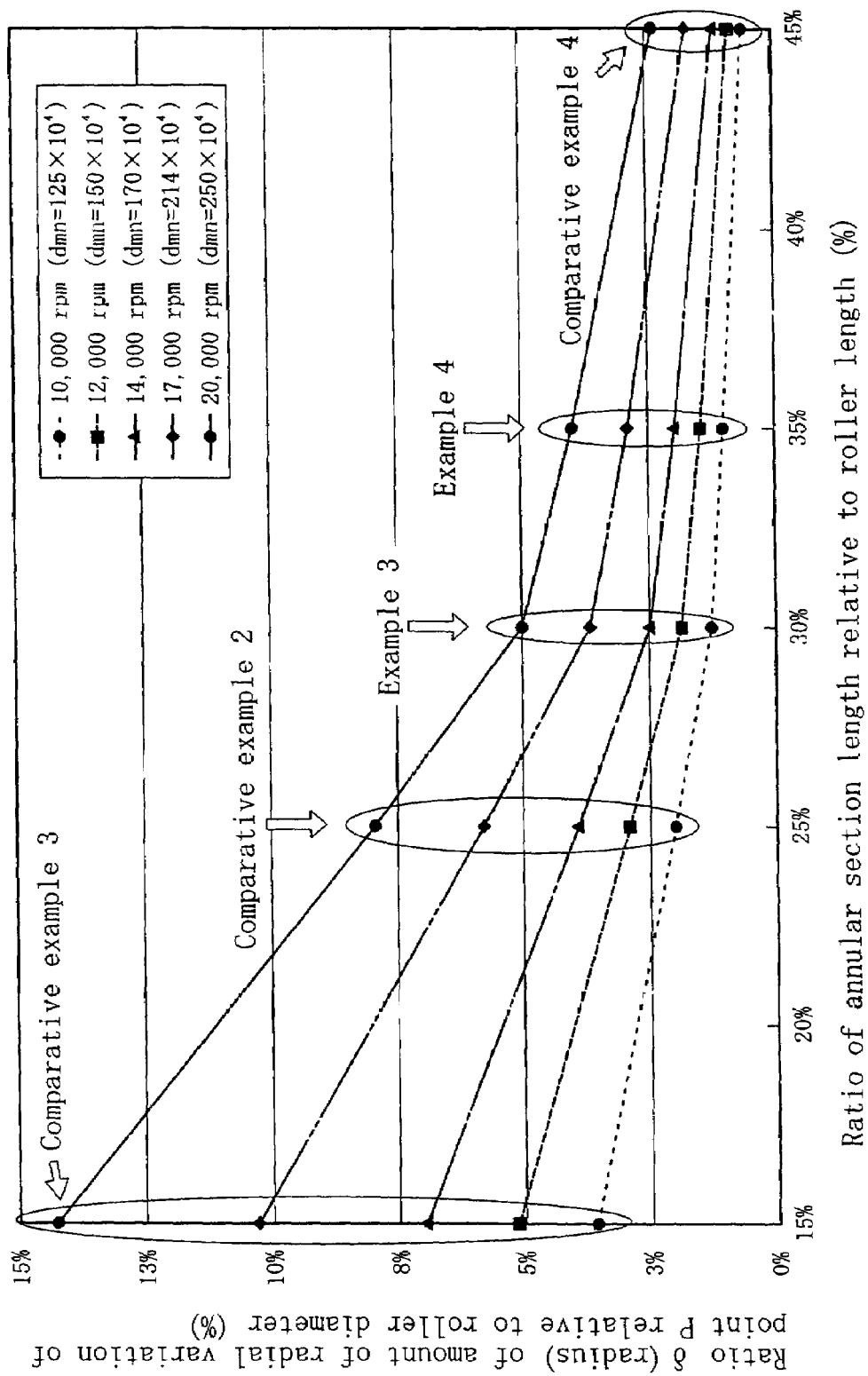
FIG. 12 shows analysis results.

As shown in FIG. 12, in the examples 3 and 4, when the rotation speed of the bearing is in the region of 14,000 rpm (dmn=1,700,000), the above ratio is held within 3%, but in contrast, in the comparative example 2, when the rotation speed of the bearing is in the region of 14,000 rpm (dmn=1,700,000), the above ratio exceeds 4%, and in the comparative example 3, the ratio exceeds 7%. In other words, in the examples 3 and 4, even when the rotation speed of the bearing is in the region of 14,000 rpm (dmn=1,700,000), the amount of elastic deformation of the tips of the pillars of the cage is at a level that causes no problems during use, but in contrast, in the comparative examples 2 and 3, when the rotation speed of the bearing is in the region of 14,000 rpm (dmn=1,700,000), the amount of elastic deformation of the tips of the pillars of the cage reaches the point where problems develop in the use of the bearing. In the comparative example 4, the amount of elastic deformation of the tips of the pillars of the cage is not particularly problematic, but the design has structural problems, as described above, which make use of the bearing difficult. Furthermore, the gradients of the five characteristic curves shown in FIG. 12, representing rotation speed regions from 10,000 rpm (dmn=1,250,000) to 20,000 rpm (dmn=2,500,000), were gentle when the ratio of the length in the axial direction of the annular section relative to the length in the axial direction of the cylindrical roller was 30% or greater, but were considerably steeper at ratios less than 30%. This finding shows that if the above ratio is less than 30%, then the setting of the length in the axial direction of the annular section acutely affects the maximum rotation speed, and therefore, it is most favorable to set the above ratio to 30% or more.

Figure 13:
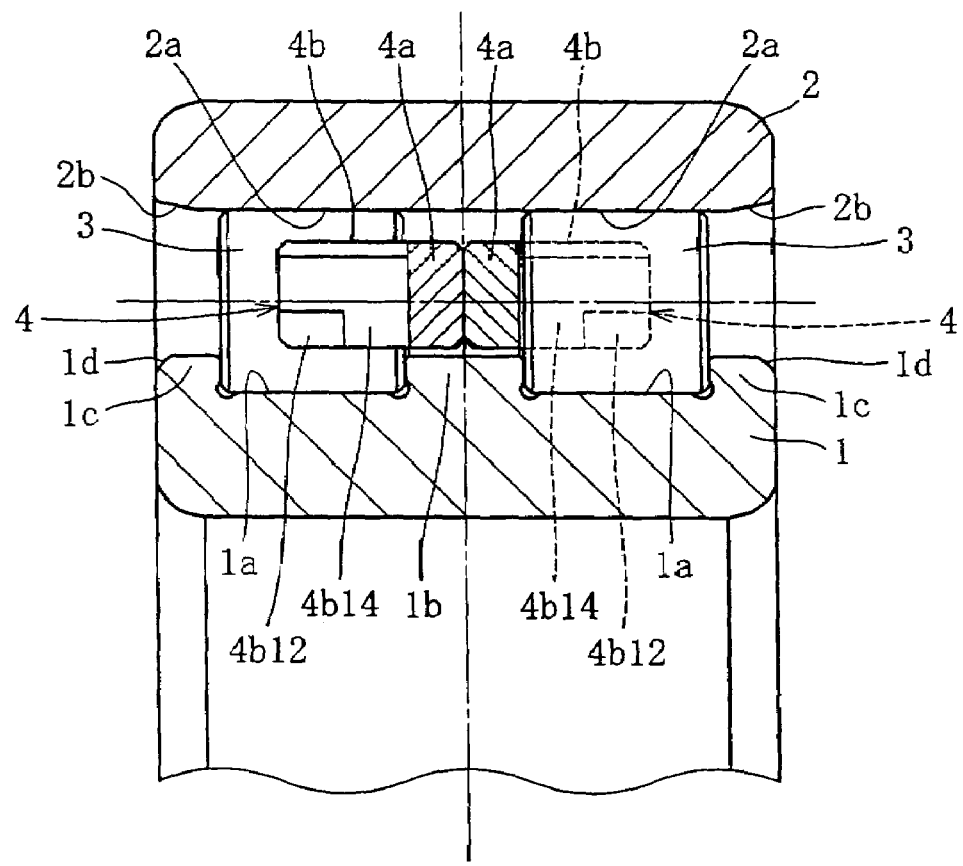
FIG. 13 is a cross-sectional view showing the main elements of a double row cylindrical roller bearing according to a seventh embodiment of the present invention.
Figure 14:
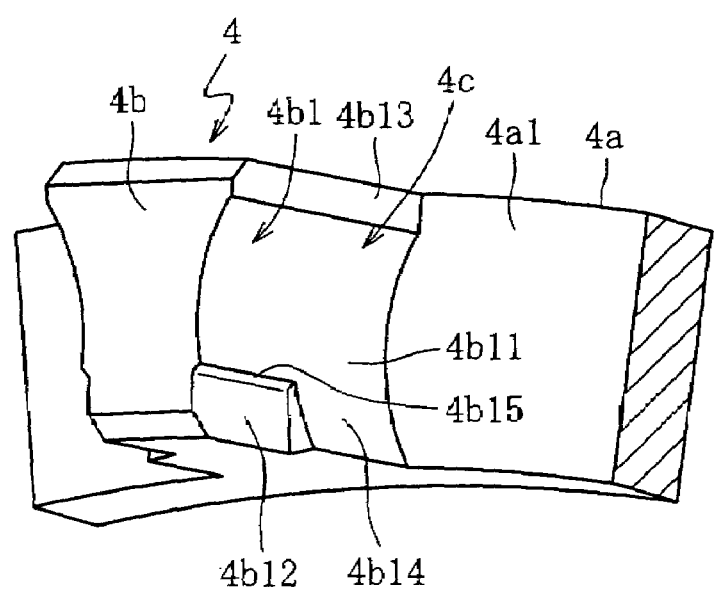
FIG. 14 is a perspective view showing the main elements of a cage according to the seventh embodiment of the present invention.
Figure 15A:
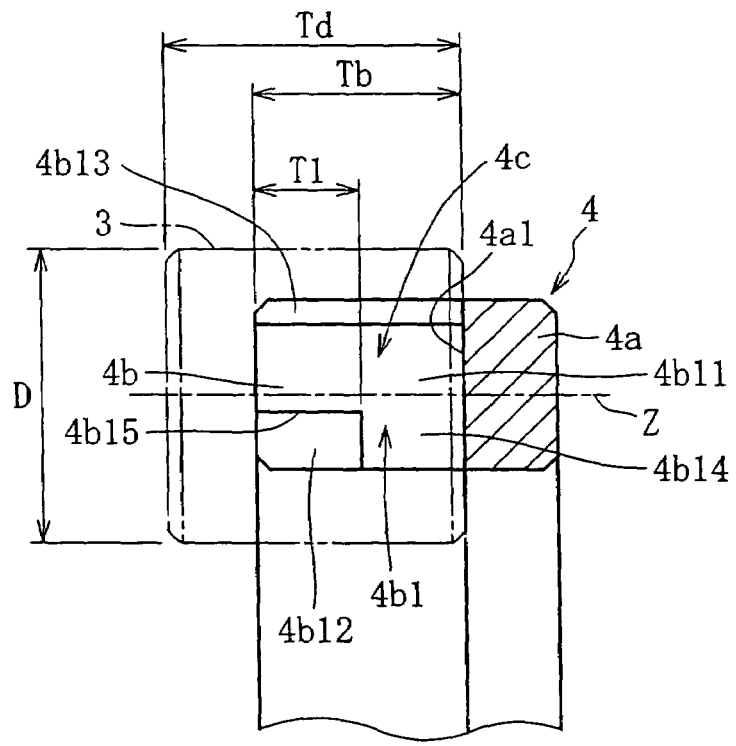
FIG. 15(a) is a cross-sectional view showing the main elements of the cage according to the seventh embodiment of the present invention.
Figure 15B:
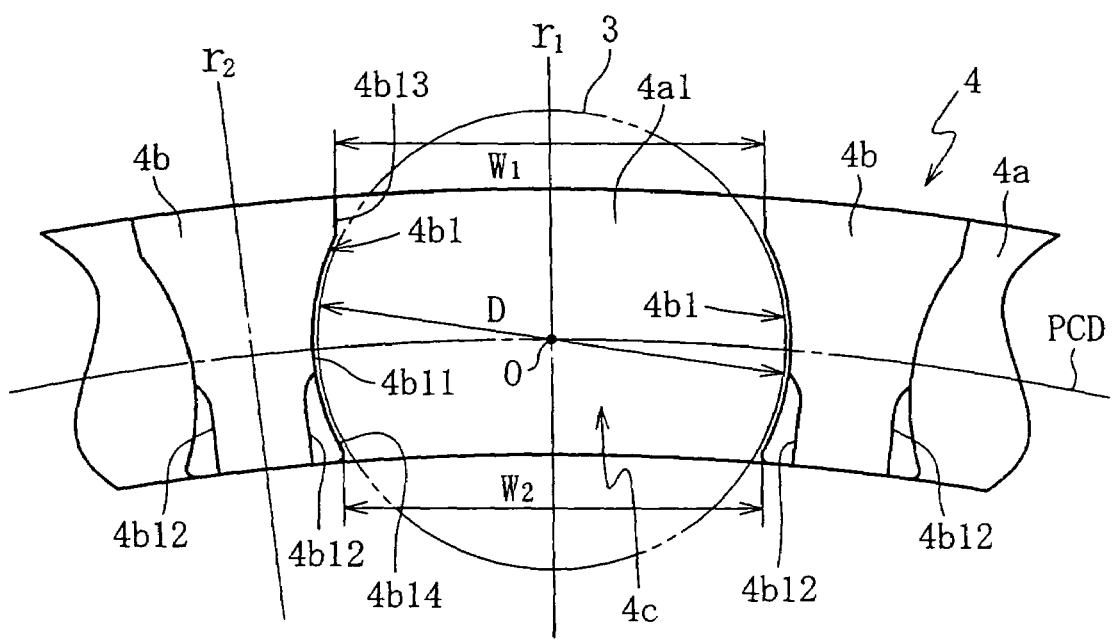
FIG. 15(b) is a partial side view of the cage, viewed from the tip end of a pillar.

FIG. 13 through FIG. 15 show a double row cylindrical roller bearing according to a seventh embodiment of the present invention. In the description of this double row cylindrical roller bearing according to the seventh embodiment, those structural elements which are in common with the double row cylindrical roller bearing according to the first embodiment shown in FIG. 1 through FIG. 3 are given the same reference numerals, and a detailed description of these structural elements is omitted.

In the cage 4 of the double row cylindrical roller bearing according to the seventh embodiment, both circumferential direction side faces 4*b*1 of each pillar 4*b* comprise a circular arc surface (a cylindrical surface) 4*b*11 formed in both the inside and outside diameter directions from the pocket PCD which passes through the pocket center O of the pocket 4*c* (in the example shown in FIG. 15, the pocket PCD is equivalent to the PCD which passes through the center of the cylindrical roller 3). Furthermore, a roll-off section 4*b*12 is formed at the tip end inner circumferential section of each circular arc surface 4*b*11 of the pillar 4*b*, and in this seventh embodiment, these roll-off sections 4*b*12 also function as first lubricant reservoirs. These first lubricant reservoirs 4*b*12 are in the form of depressions that are open at the tip and the inner circumferential end (see FIG. 14), and comprise a stepped section in the shape of a curved depression at the outer circumferential side edge 4*b*15. These roll-off sections 4*b*12 are formed on the inner circumferential side of the pocket PCD.

Specifically, as shown in FIGS. 15(*a*) and 15(*b*), the circular arc surface 4*b*11 of the pillar 4*b* is drawn as a circular arc about the pocket center O with a radius of between 1.005 and 1.1 times the radius (D/2) of the cylindrical roller 3. The outside diameter end of this arc connects with a straight surface 4*b*13 which is parallel to the radial line r1 that passes through the pocket center O. The clearance W1 between opposing straight surfaces 4*b*13, which face each other in the circumferential direction, is less than the diameter D of the cylindrical roller 3, and as a result, travel of the cylindrical roller 3 from the pocket 4*c* toward the outside diameter is restricted. The inner circumferential end of the circular arc surface 4*b*11 extends to the inner circumferential end of the pillar 4*b* at the base end, and at the tip end, connects with the first lubricant reservoir (roll-off section) 4*b*12 of the inner circumferential section. The minimum clearance W2 between base end inner circumferential sections 4*b*14 of opposing circular arc surfaces 4*b*11, which face each other in the circumferential section, is smaller than the diameter D of the cylindrical roller 3. The base end inner circumferential sections 4*b*14 act as a guide section which guides the rolling contact surface of the cylindrical roller 3 when the centrifugal force generated during rotation causes the pillar 4*b* to undergo outward elastic deformation.

The first lubricant reservoir 4*b*12 is formed from the tip of the pillar 4*b*, along the center axis Z (the center axis of the cylindrical roller 3 or the pocket 4*c*), to a point partway to the base end section, and has sufficient width to be recessed farther toward the circumferential direction center line r2 of the pillar 4*b* than the base end inner circumferential section 4*b*14. The length T1 in the axial direction of the first lubricant reservoir 4*b*12 is set to between 10 and 35% of the length Td in the axial direction of the cylindrical roller 3. Furthermore, within the circumferential direction side face of the first lubricant reservoir 4*b*12, a straight surface that is parallel with the circumferential direction centerline r2 of the pillar 4*b*, meets the arc shaped stepped section of the outer circumferential side edge 4*b*15. Forming the first lubricant reservoir 4*b*12 in this manner means that even when centrifugal force during high speed rotation causes the pillar 4*b* to undergo outward elastic deformation along the circumferential direction centerline r2, there is still no contact between the pillar 4*b* and the rolling contact surface of the cylindrical roller 3. The minimum clearance between the circumferential direction side faces of opposing first lubricant reservoirs 4*b*12, which face each other in the circumferential direction, is substantially equal to the diameter D of the cylindrical roller 3. However, because the first lubricant reservoirs 4*b*12 are displaced toward the outside diameter along the circumferential direction centerline r2, no contact occurs with the rolling contact surface of the cylindrical roller 3. In this manner, by forming a straight surface that is parallel with the circumferential direction centerline r2 on the circumferential direction side face of the first lubricant reservoir 4*b*12, a thicker circumferential direction wall thickness can be obtained for the tip end inner circumferential section of the pillar 4*b* than in the case where the side face is formed with a straight surface parallel to the radial line r1, thereby improving the rigidity of the pillar 4*b*.

As shown in FIG. 13, in this seventh embodiment, the cage 4 is a rolling element guided cage, which rotates during bearing rotation with the inner circumferential direction side faces 4*b*1 of the pillars 4*b* guided while in contact with the rolling contact surface of the cylindrical rollers 3. When the rotation of the bearing reaches a predetermined speed, and centrifugal force causes the pillars 4*b* to undergo outward elastic deformation, the base end inner circumferential sections (the roller guide sections) 4*b*14 of the circumferential direction side faces 4*b*1 of the pillars 4*b* are displaced in a direction that reduces the pocket gap between the pillars 4*b* and the rolling contact surface of the cylindrical rollers 3 (that is, toward the outside diameter along the circumferential direction centerline r2) to guide the rolling contact surface of the cylindrical rollers 3. As a result, a favorable equalization capacity of the cylindrical rollers 3 is ensured, and the non repeatable run-out (NRRO) during high speed rotation is reduced to an acceptable level. At this time, because the first lubricant reservoirs 4*b*12, which also act as roll-off sections, are provided at the tip end inner circumferential sections of the circumferential direction side faces 4*b*1 of the pillar 4*b*, contact with the rolling contact surface of the cylindrical roller 3 is avoided. In addition, forming the base end inner circumferential section (the roller guide section) 4*b*14 of the circumferential direction side face 4*b*1 as a circular arc surface that follows the rolling contact surface of the cylindrical roller 3 increases the wall thickness in the circumferential direction of the base end inner circumferential section 4*b*14 of the pillar 4*b*, which improves the rigidity of the pillar 4*b*. Consequently, the amount of elastic deformation of the pillar 4*b* in both the outward direction and the circumferential direction, caused by either the centrifugal force generated during rotation or the load from the cylindrical roller 3, is able to be reduced. This means that the favorable equalization capacity of the cylindrical rollers 3 is able to be maintained.

In this case, because the first lubricant reservoirs 4*b*12, which also function as roll-off sections for the contact described above, are formed on the circumferential direction side faces 4*b*1 of the pillars 4*b*, even if the lubricant such as grease or oil which coats the cylindrical rollers 3 is scraped off by the circular arc surfaces 4*b*11 of the pillars 4*b* during rolling of the rollers, the lubricant is replenished from the first lubricant reservoirs 4*b*12, and consequently there is much less likelihood of poor lubrication between the pillars 4*b* and the cylindrical rollers 3. Because satisfactory lubrication properties can be ensured even during high speed rotation, it is possible to prevent, to a large degree, problems such as seizing and the like caused by poor lubrication.

FIG. 16 through FIG. 19 show a double row cylindrical roller bearing and cage according to an eighth embodiment of the present invention. The description below of the cage 4 according to the eighth embodiment focuses on the points of difference from the cage according to the seventh embodiment. The other structural elements and effects are as described in the seventh embodiment, and accordingly, those elements that are common to both embodiments are given the same reference numerals in the figures, and those sections of the description which repeat are omitted.

Figure 16:
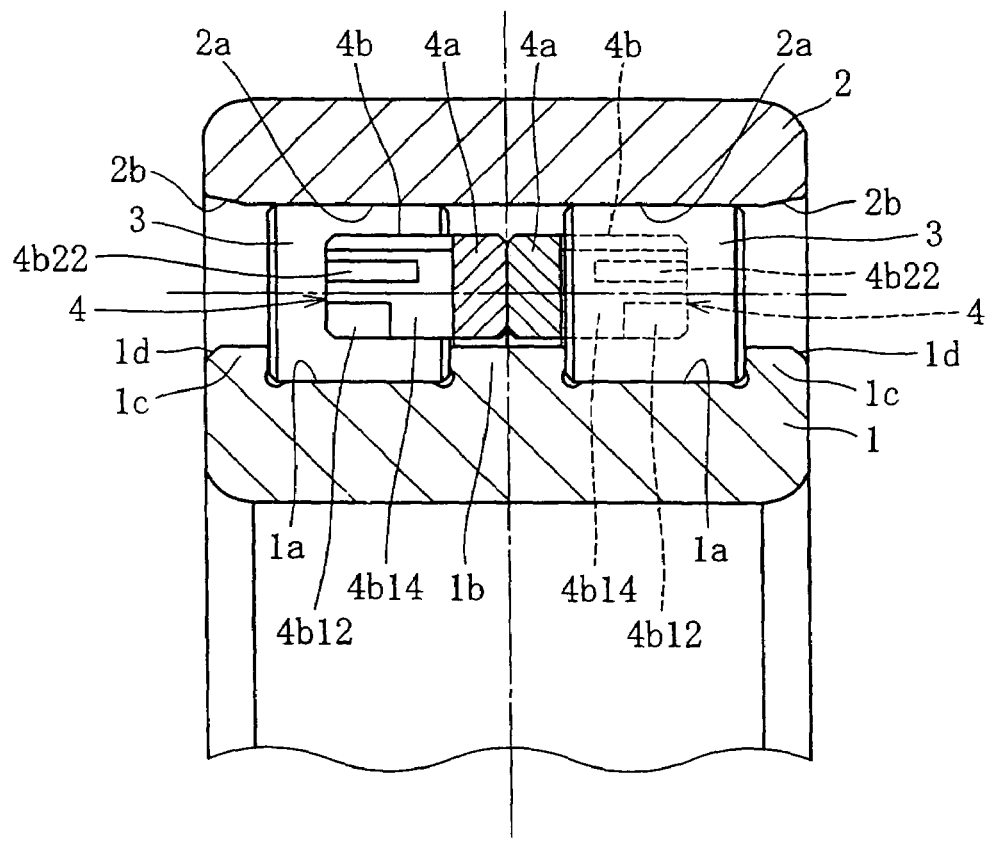
FIG. 16 is a cross-sectional view showing the main elements of a double row cylindrical roller bearing according to an eighth embodiment of the present invention.
Figure 17:
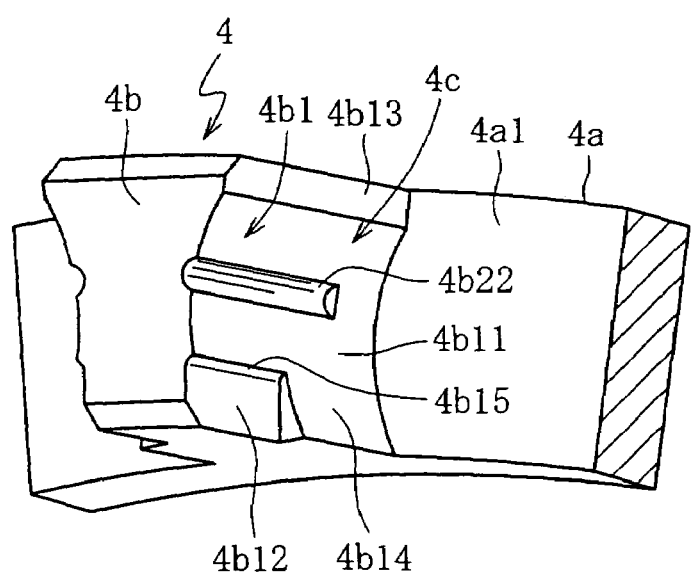
FIG. 17 is a perspective view showing the main elements of a cage according to the eighth embodiment of the present invention.

As shown in FIG. 16 and FIG. 17, in the cage 4 according to the eighth embodiment, second lubricant reservoirs 4*b*22 comprising straight grooves are formed in the circular arc surfaces 4*b*11 of the pillar 4*b* in a separate position on the outer circumferential side of the roll-off sections (first lubricant reservoir sections) 4*b*12. These second lubricant reservoirs 4*b*22 are provided on the outer circumferential side of the pocket PCD in the form of grooves that are open only at the tip. Furthermore, each second lubricant reservoir 4*b*22 is formed from the tip of the pillar 4*b*, along the direction of the center axis Z, to a point partway to the base end section, and the length in the axial direction of the second lubricant reservoir is longer than that of the first lubricant reservoir 4*b*12.

Figure 18A:
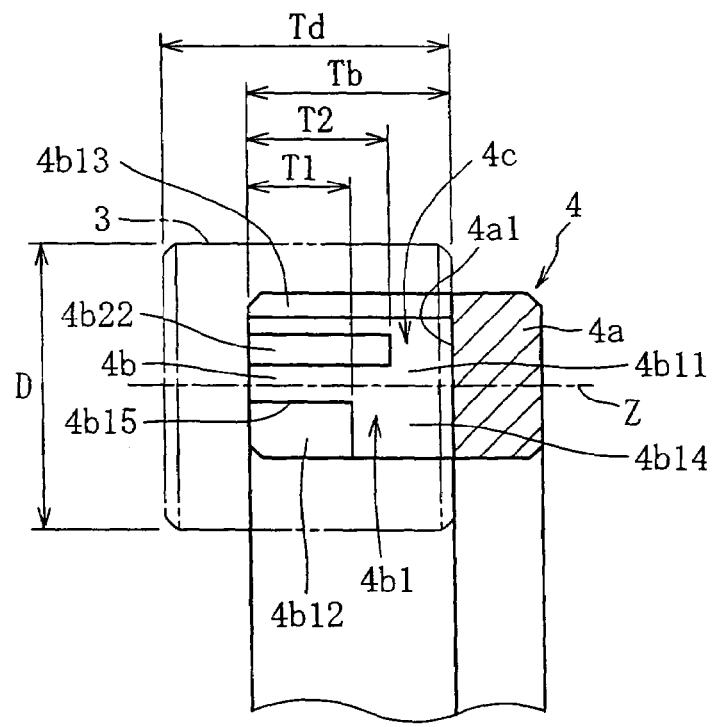
FIG. 18(a) is a cross-sectional view showing the main elements of the cage according to the eighth embodiment of the present invention.
Figure 18B:
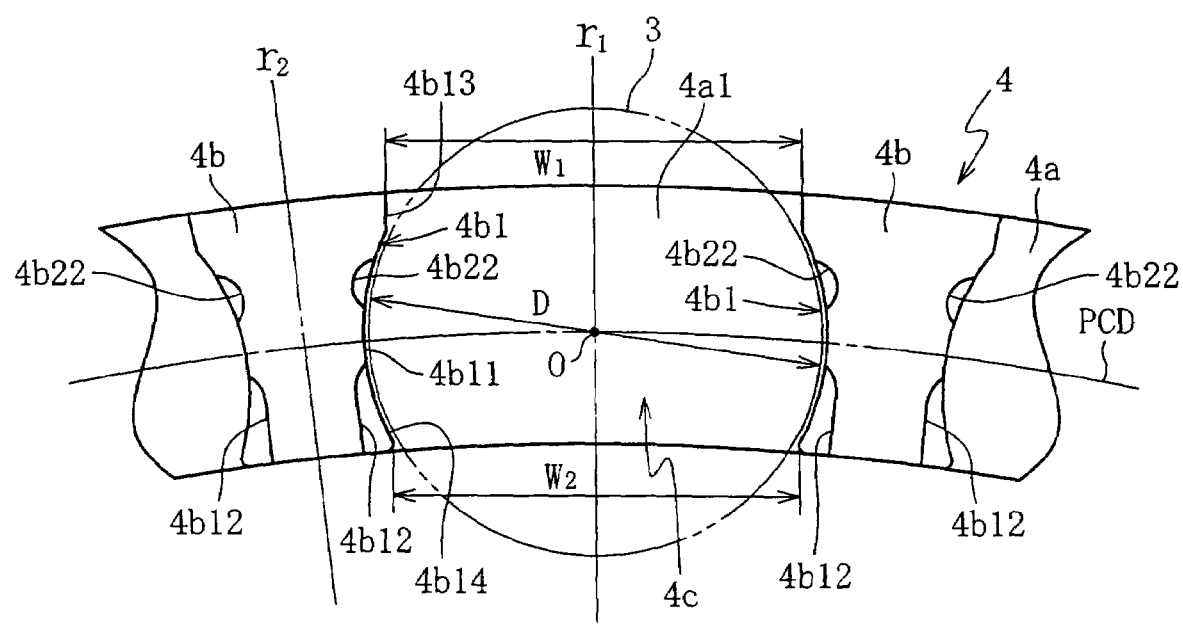
FIG. 18(b) is a partial side view of the cage, viewed from the tip end of a pillar.

Specifically, as shown in FIGS. 18(*a*) and 18(*b*), the length T2 in the axial direction of the second lubricant reservoir 4*b*22 is between 40 and 60%, and is preferably 50%, of the length Td in the radial direction of the cylindrical roller 3. The dimensions of the two components are set such that the second lubricant reservoir 4*b*22 is disposed at substantially the center axis of the cylindrical roller 3. Furthermore, as shown in FIGS. 19(*a*) and 19(*b*), the groove depth Tx of the second lubricant reservoir 4*b*22 is set to between 2 and 8% of the diameter D of the cylindrical roller 3, and the groove width Ty of the second lubricant reservoir 4*b*22 is set to between 10 and 15% of the diameter D of the cylindrical roller 3.

Figure 19A:
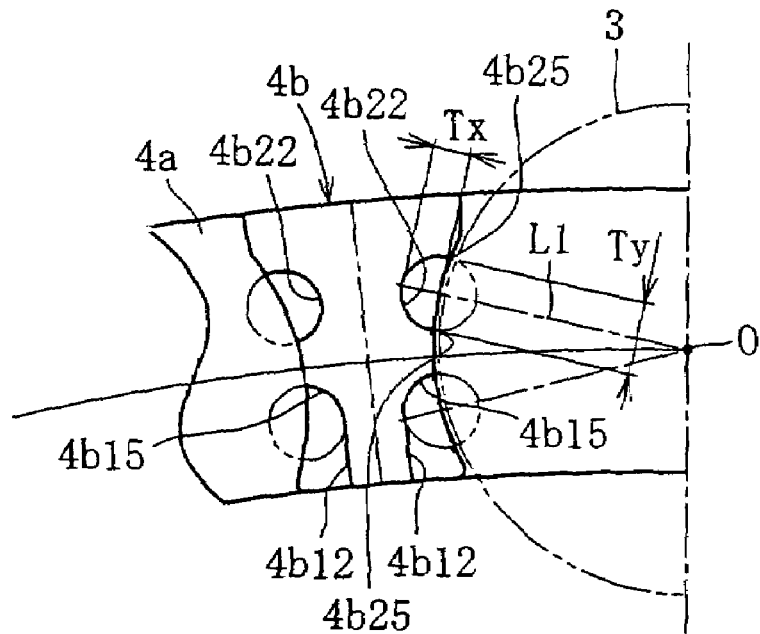
FIG. 19(a) is a partial side view of the cage (with the maximum groove size) according to the eighth embodiment of the present invention, viewed from the tip end of a pillar of the cage.
Figure 19B:
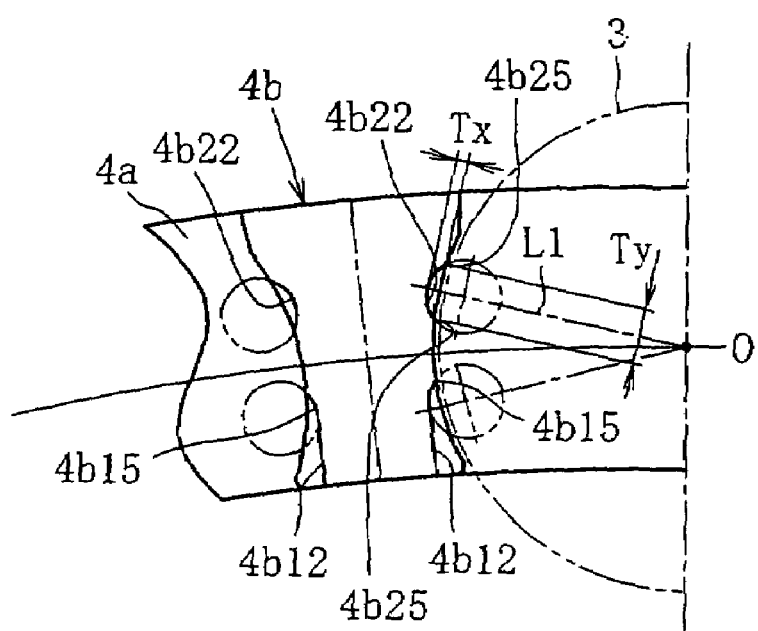
FIG. 19(b) is a partial side view of the cage (with the minimum groove size) according to the eighth embodiment of the present invention, viewed from the tip end of the pillar of the cage.

Here, FIG. 19(*a*) shows an example of a case where the groove depth Tx of the second lubricant reservoir 4*b*22 and the groove width Ty of the second lubricant reservoir 4*b*22 are at the upper limits of the above ranges, and FIG. 19(*b*) shows an example of a case where the groove depth Tx of the second lubricant reservoir 4*b*22 and the groove width Ty of the second lubricant reservoirs 4*b*22 are at the lower limits. As shown in these figures, the bottom surface of the groove of the second lubricant reservoir 4*b*22 is formed in a circular arc shape (cylindrical shape). In this case, the measurement from the surface of the circular arc surface 4*b*11 to the bottom surface of the groove along a straight line L1, which represents the longest line from the pocket center O to the bottom surface of the groove, is deemed the groove depth Tx, and the gap between the edges 4*b*25 on both sides of the second lubricant reservoir 4*b*22 in the width direction, measured orthogonally to the straight line L1, is deemed the groove width Ty. Furthermore, circular arc shaped surfaces (stepped sections) are also formed at the outer circumferential side edges 4*b*15 of each first lubricant reservoir 4*b*12, with the same curvature and the same depth as the groove surfaces of the second lubricant reservoir 4*b*22. The circumferential direction side faces of the first lubricant reservoirs 4*b*12 need not necessarily have a stepped section at the outer circumferential side edges, and the outer circumferential side edges may instead connect directly with a straight surface which is parallel to the circumferential direction center line r2.

With the cage 4 according to the eight embodiment, because both first lubricant reservoirs 4*b*12, which also function as roll-off sections, and second lubricant reservoirs 4*b*22 are formed in the circumferential direction side faces 4*b*1 of the pillars 4*b*, even if the lubricant such as grease or oil which coats the cylindrical rollers 3 is scraped off by the circular arc surfaces 4*b*11 of the pillars 4*b*, the lubricant is replaced from the two lubricant reservoirs 4*b*12 and 4*b*22, and consequently there is much less likelihood of poor lubrication between the pillars 4*b* and the cylindrical rollers 3. Furthermore, because a total of four lubricant reservoirs 4*b*12 and 4*b*22 are formed in a single pocket 4*c*, the supply of lubricant is reliable and adequate, meaning satisfactory lubrication properties can be maintained over long periods, allowing further improvement in durability and a longer life for the bearing. Because satisfactory lubrication properties can be ensured even during high speed rotation, it is possible to prevent, with even more certainty, problems such as seizing and the like caused by poor lubrication.

Furthermore, because the first lubricant reservoirs 4*b*12 are formed on the inner circumferential side of the pocket PCD, and the second lubricant reservoirs 4*b*22 are formed on the outer circumferential side of the pocket PCD, contact between the tip end inner circumferential sections of the pillars 4b and the cylindrical rollers 3 is avoided, while the appropriate amount of lubricant can be supplied evenly across the entire area of the inner circumferential direction side faces 4b1 of the pillars 4b. In addition, because the second lubricant reservoirs 4b22 are formed as straight grooves extending in the axial direction, sufficient strength can be ensured when centrifugal force causes the pillars 4b to undergo elastic deformation, and the appropriate amount of lubricant can be supplied over a wide area in the axial direction of the pillars 4b. Furthermore, because the second lubricant reservoirs 4b22 are formed from points partway along the pillars 4b in the axial direction, through to the tips of the pillars, the straight grooves 4b22 do not extend as far as the axial base ends (the bottoms) of the pillars 4b, meaning a suitably high level of high rigidity can be maintained for those parts of the pillars 4b which require it, and enabling sufficient resistance to elastic deformation to be obtained.

In addition, because the groove length (the length in the axial direction) T2 of the second lubricant reservoirs 4b22 is set to between 40 and 60% of the length Td in the axial direction of the cylindrical roller 3, problems such as a deterioration in the lubrication characteristics, which occur at values under 40%, and problems such as a reduction in the rigidity of the pillars 4b, which occur at values exceeding 60%, can be avoided. Furthermore, because the groove depth Tx of the second lubricant reservoirs 4b22 is set to between 2 and 8% of the diameter D of the cylindrical roller 3, problems such as an inability to hold a sufficient quantity of lubricant, which occur at values less than 2%, and problems such as the wall thickness becoming too thin within certain sections of the pillar 4b, which occur at values exceeding 8%, can be avoided. In addition, because the groove width Ty of the second lubricant reservoirs 4b22 is set to between 10 and 15% of the diameter D of the cylindrical roller 3, then particularly in those cases where the inside surface of the groove is a circular arc surface, problems such as an inability to hold a sufficient quantity of lubricant, which occur at values less than 10%, and problems such as the wall thickness becoming too thin within certain sections of the pillar 4b, which occur at values exceeding 15%, can be avoided, and it is also possible to avoid reducing the roller guide section 4b14.

Figure 20A:
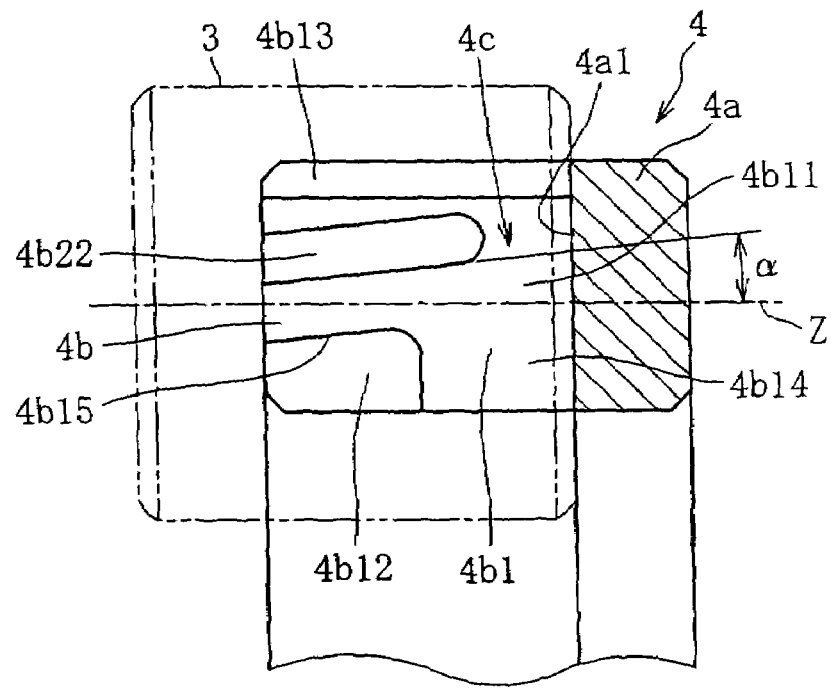
FIG. 20(a) is a cross-sectional view showing the main elements of a cage according to a ninth embodiment of the present invention.
Figure 20B:
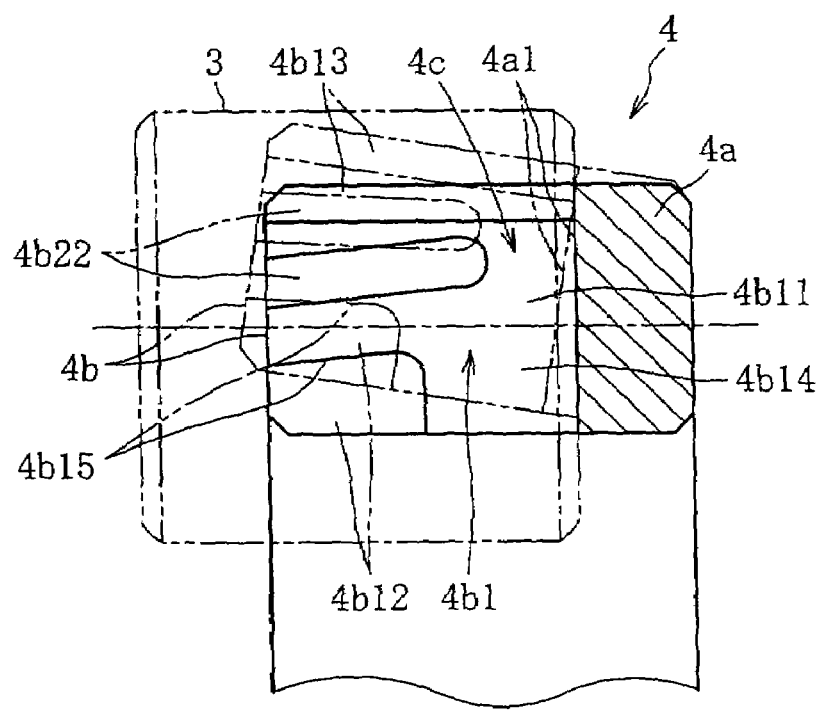
FIG. 20(b) is a cross-sectional view showing the action of the cage.

In a cage 4 according to a ninth embodiment of the present invention shown in FIGS. 20(a) and 20(b), the straight grooves that form the second lubricant reservoirs 4b22 are formed at an incline in the opposite direction to the direction of inclination of the pillars 4b relative to the center axis Z that occurs when centrifugal force generated during rotation causes the pillars 4b to undergo elastic deformation, that is, the groove is inclined toward the inside diameter as it approaches the tip end, and the straight outer circumferential side edges 4b15 of the first lubricant reservoirs 4b12 are also inclined in the same direction relative to the center axis Z. By using such a construction, the problem that occurs when both the outer circumferential side edges 4b15 of the first lubricant reservoirs 4b12 and the second lubricant reservoirs 4b22 are formed in parallel with the center axis Z, or alternatively, are formed at an incline toward the outside diameter as they approach the tip ends, that is, the problem of the elastic deformation of the pillars 4b causing the lubricant to escape all at once from the lubricant reservoirs 4b12 and 4b22, making it difficult to maintain lubrication over a long period of time, can be avoided. In other words, even when centrifugal force causes the pillars 4b to undergo elastic deformation as shown by the dashed line in FIG. 20(b), lubricant can still be supplied or replenished gradually from the lubricant reservoirs 4b12 and 4b22, meaning it is possible to ensure favorable lubrication characteristics even during high speed rotation.

In this case, the angle of inclination α of both 4b15 and 4b22 is preferably between 2 and 10 degrees. In other words, if the angle of inclination is less than two degrees, then a slight elastic deformation of the pillars 4b would cause the direction of inclination of the lubricant reservoirs 4b12 and 4b22 relative to the center axis Z to align with the direction of inclination of the pillars 4b relative to the center axis Z, which then leads to the situation where the centrifugal force causes the lubricant to escape all at once from the lubricant reservoirs 4b12 and 4b22. On the other hand, if the angle of inclination exceeds 10 degrees, then even if the pillars 4b undergo a large amount of elastic deformation, a variety of problems can arise, including difficulty in supplying or replenishing a sufficient quantity of lubricant from the lubricant reservoirs 4b12 and 4b22, or difficulty in forming the lubricant reservoirs 4b12 and 4b22 in the limited area available on each pillar. Accordingly, such problems are less likely to occur if the angle of inclination of the lubricant reservoirs 4b12 and 4b22 is set within a range from 2 to 10 degrees.

The other structural elements and effects of the ninth embodiment are as described in the eighth embodiment, and accordingly, those structural elements that are common to both embodiments are given the same reference numerals in FIGS. 20(a) and 20(b), and those sections of the description which repeat are omitted.

Figure 21A:
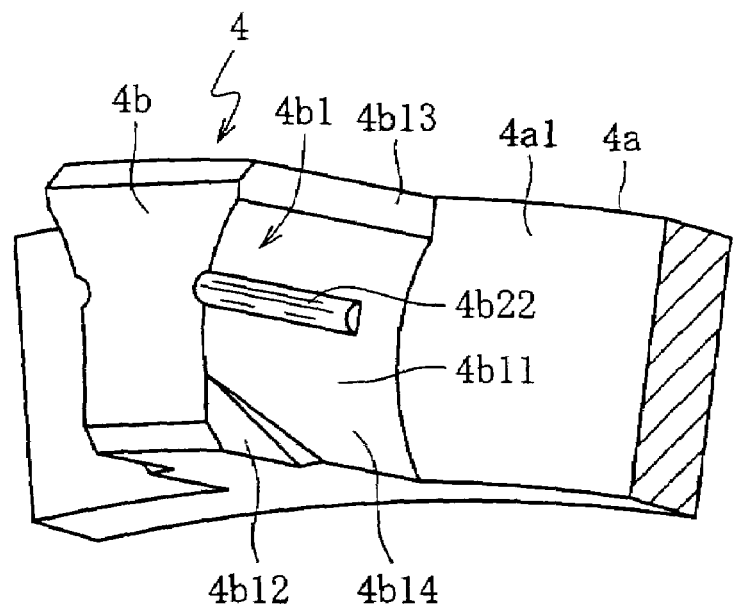
FIG. 21(a) is a perspective view showing the main elements of a cage according to a tenth embodiment of the present invention.
Figure 21B:
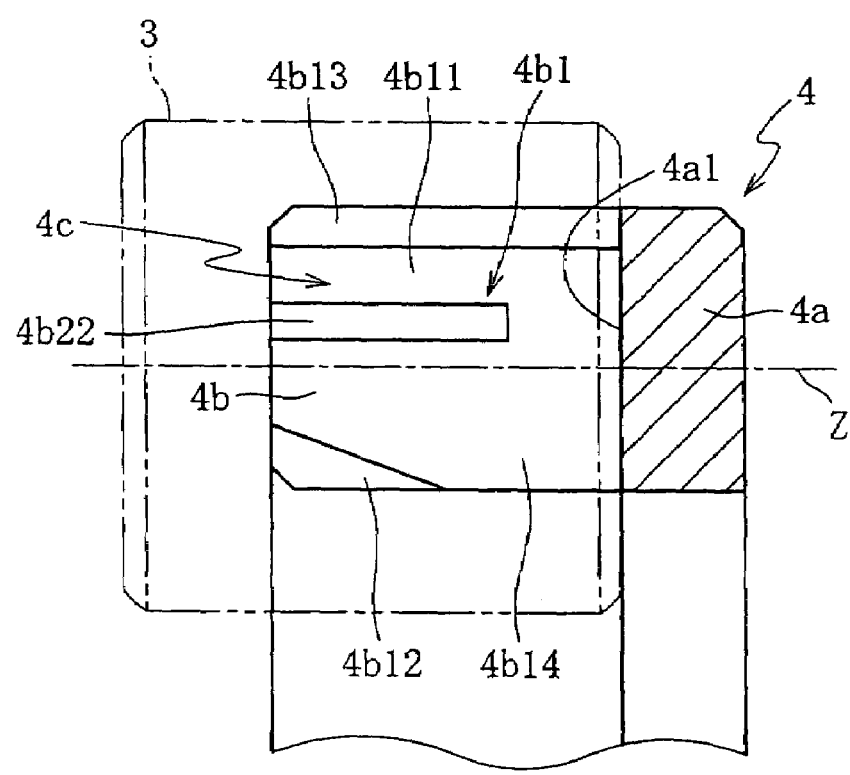
FIG. 21(b) is a cross-sectional view showing the main elements of the cage.

In a cage 4 according to a tenth embodiment of the present invention shown in FIGS. 21(a) and 21(b), the outer circumferential ends of the first lubricant reservoirs 4b12 of each pillar 4b are formed at an incline toward the inside diameter from the tip of the pillar 4b to the base. In this case, the straight groove that functions as the second lubricant reservoir 4b22 may be inclined in the opposite direction to the direction of inclination of the pillar 4b relative to the center axis Z that occurs when centrifugal force generated during rotation causes the pillar 4b to undergo elastic deformation. The other structural elements and effects of the tenth embodiment are as described in the eighth embodiment, and accordingly, those structural elements that are common to both embodiments are given the same reference numerals in FIGS. 21(a) and 21(b), and those sections of the description which repeat are omitted.

Figure 22:
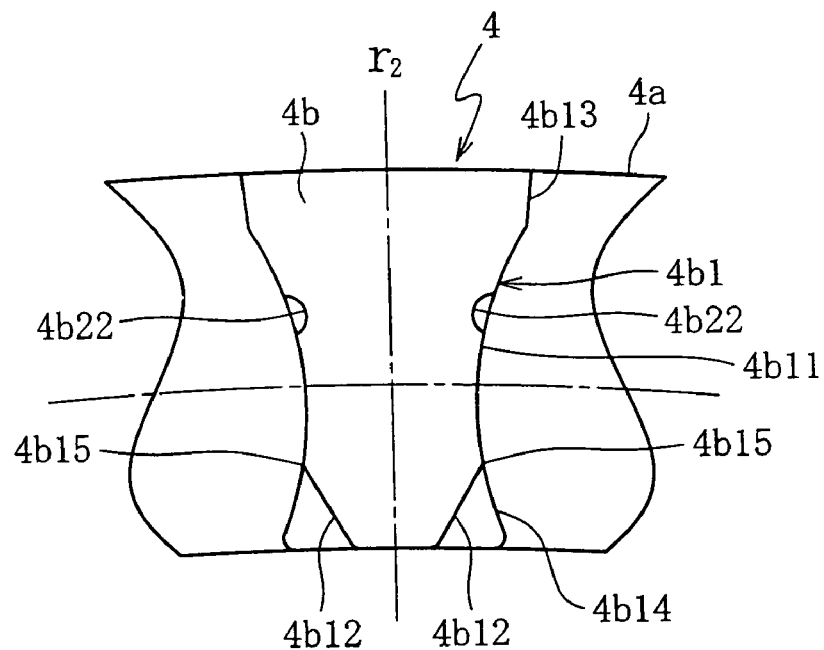
FIG. 22 is a partial side view of a cage according to an eleventh embodiment of the present invention, viewed from the tip end of a pillar.
Figure 23:
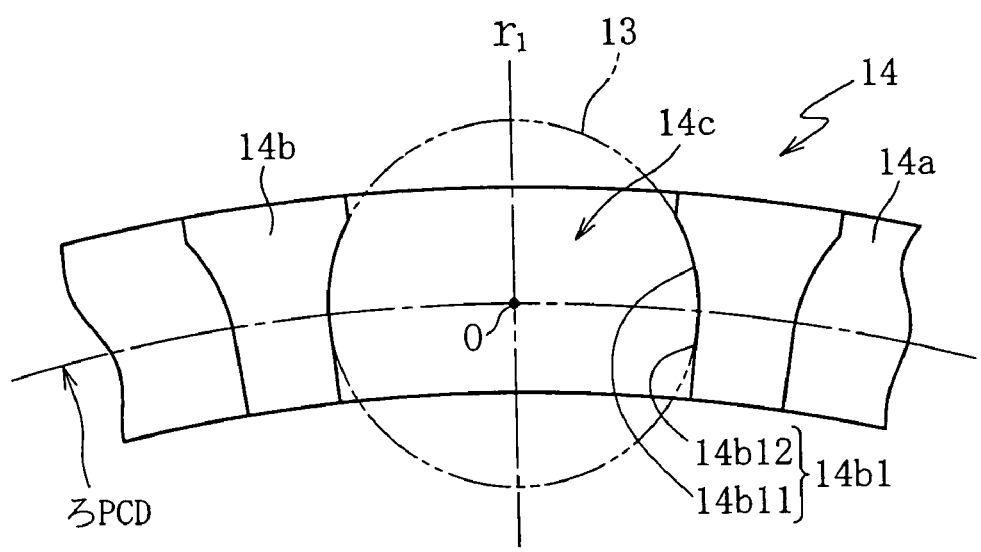
FIG. 23 is a partial side view of a cage in a conventional cylindrical roller bearing, viewed from the tip end of a pillar.
Figure 24:
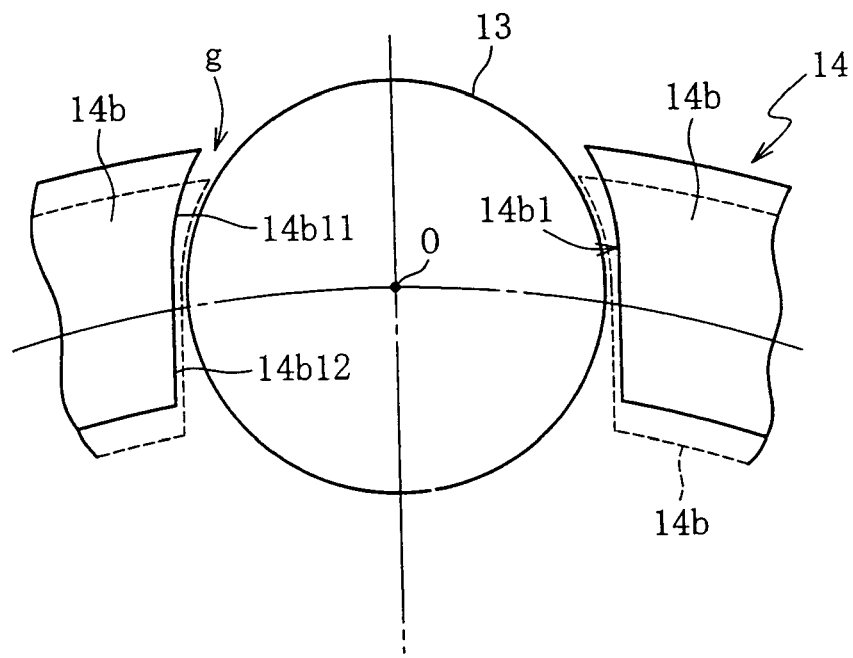
FIG. 24 shows a schematic representation of a state where the pillars of the cage in a conventional cylindrical roller bearing have undergone outward elastic deformation due to the effects of centrifugal force during high speed rotation (solid lines), and a state prior to the deformation (dashed lines)
Figure 25:
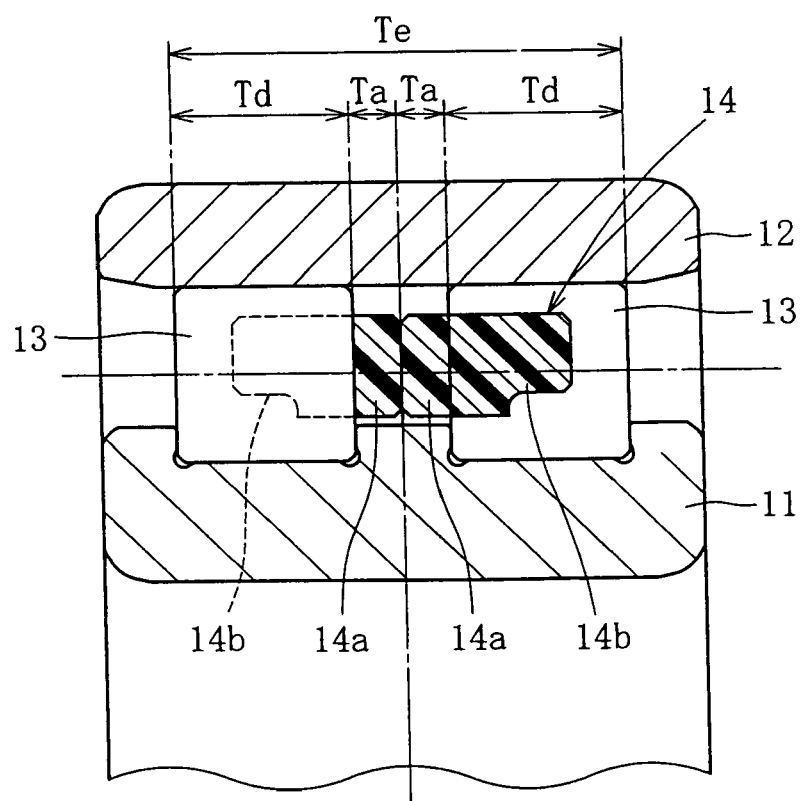
FIG. 25 is a cross-sectional view showing the main elements of a conventional double row cylindrical roller bearing.

In a cage 4 according to an eleventh embodiment of the present invention shown in FIG. 22, the circumferential direction side faces of the first lubricant reservoirs 4b12 of each pillar 4b are formed as inclined surfaces, inclined toward the circumferential direction centerline r2 of the pillar 4b. In this case, the straight grooves that function as the second lubricant reservoirs 4b22, and the outer circumferential side edges 4b15 of the first lubricant reservoirs 4b12, may be inclined in the opposite direction to the direction of inclination of the pillar 4b relative to the center axis Z that occurs when centrifugal force generated during rotation causes the pillar 4b to undergo elastic deformation. This eleventh embodiment may be combined with the tenth embodiment. The other structural elements and effects of the eleventh embodiment are as described in the eighth embodiment, and accordingly, those structural elements that are common to both embodiments are given the same reference numerals in FIG. 22, and those sections of the description which repeat are omitted.

In the seventh through eleventh embodiments described above, the guiding method of the cages is not limited to rolling element guiding, and outer ring guiding or inner ring guiding may also be used. In other words, the present invention does not specify any particular guiding method. Furthermore, FIG. 16 shows an example of an NN type double row cylindrical roller bearing, but the present invention can be applied in the same manner to both NNU type and other types of double row cylindrical roller bearings. In addition, the present invention is not limited to use in double row cylindrical roller bearings, and can be applied in the same manner to single row cylindrical roller bearings and multiple row cylindrical roller bearings. Furthermore, in the seventh through eleventh embodiments described above, the first lubricant reservoirs 4b12 (and preferably, also the second lubricant reservoirs 4b22) were formed in all of the pillars 4b, which extend axially in an integrated, continuous manner from the annular section 4a, but alternative constructions may also be used in which the first lubricant reservoirs 4b12 (and preferably, also the second lubricant reservoirs 4b22) are formed in every second, or third or greater pillar 4b.

What is claimed is:

1. A cylindrical roller bearing comprising: an inner ring; an outer ring; a plurality of cylindrical rollers arranged between the inner ring and the outer ring in a freely rollable manner; and a cage made of a synthetic resin, in which the cage comprises an annular section, a plurality of pillars extending in one axial direction from an inside surface of the annular section, and a plurality of pockets, which are formed between circumferential direction side faces of the pillars positioned adjacently in a circumferential direction, and hold the cylindrical rollers in a freely rollable maimer, wherein the circumferential direction side faces of the pillars of the cage comprise, at a base end inner circumferential section, a roller guide section, which is formed as a circular arc surface that follows the rolling contact surface of the cylindrical roller, and guides the rolling contact surface of the cylindrical roller when centrifugal force causes the pillar to undergo outward elastic deformation during rotation, and comprise, at the tip end inner circumferential section, a roll-off section, which is recessed farther toward the circumferential center of the pillar than the roller guide section, and prevents radial contact pressure from occurring with the rolling contact surface of the cylindrical roller when centrifugal force generated during rotation causes the pillar to undergo outward elastic deformation.

2. The cylindrical roller bearing according to claim 1, wherein the length in the axial direction of the roll-off section is between 10 and 35% of the length in the axial direction of the cylindrical roller.

3. The cylindrical roller bearing according to claim 1, wherein a line connecting a start position of the roll-off section in the radial direction and a center of the pocket forms an angle on the inside diameter side of 20 degrees or less relative to the tangent of the pocket PCD at the pocket center.

4. The cylindrical roller bearing according to claim 1, wherein the circumferential direction side face of the roll-off section is formed as a straight surface that is parallel to a circumferential direction centerline of the pillar.

5. The cylindrical roller bearing according to claim 1, wherein the circumferential direction side face of the roll-off section is formed as an inclined surface, inclined toward the circumferential direction centerline of the pillar.

6. The cylindrical roller bearing according to claim 1, wherein the roller bearings are arranged in a plurality of rows, and each row of the roller bearings is held individually by the case.

7. A cylindrical roller bearing comprising: an inner ring; an outer ring; a plurality of cylindrical rollers arranged between the inner ring and the outer ring in a freely rollable manner; and a cage made of a synthetic resin, in which the cage comprises an annular section, a plurality of pillars extending in one axial direction from an inside surface of the annular section, and a plurality of pockets, which are formed between circumferential direction side faces of the pillars positioned adjacently in a circumferential direction, and hold the cylindrical rollers in a freely rollable manner, wherein the length in the axial direction of the annular section of the cage is set to a value between 30 and 40% of the length in the axial direction of the cylindrical rollers.

8. The cylindrical roller bearing according to claim 7, wherein a chamfered section is formed on the outside in the axial direction of the raceway surface of the inner ring and/or outer ring along which the cylindrical roller rolls, and the entire area of the rolling contact surface of the cylindrical roller is situated axially inward from the position of the boundary between the raceway surface and the chamfered section.

9. The cylindrical roller bearing according to claim 8, wherein the chamfered section is formed at an angle of inclination of between 10 and 30 degree relative to the cylindrical surface formed by the raceway surface.

10. The cylindrical roller bearing according to claim 7, wherein the circumferential direction side faces of the pillars of the cage comprise, at the base end inner circumferential section, a roller guide section, which is formed as a circular arc surface that follows the rolling contact surface of the cylindrical roller, and guides the rolling contact surface of the cylindrical roller when centrifugal force causes the pillar to undergo outward elastic deformation during rotation, and comprise, at the tip end inner circumferential section, a roll-off section, which is recessed farther toward the circumferential center of the pillar than the roller guide section, and prevents radial contact pressure from occurring with the rolling contact surface of the cylindrical roller when centrifugal force generated during rotation causes the pillar to undergo outward elastic deformation.

11. The cylindrical roller bearing according to claim 10, wherein the length in the axial direction of the roll-off section is set to a value between 10 and 35% of the length in the axial direction of the cylindrical roller.

12. The cylindrical roller bearing according to claim 7, wherein the length in the axial direction of the pillars of the cage is set to a value between 65 and 75% of the length in the axial direction of the cylindrical rollers.

13. The cylindrical roller bearing according to claim 7, wherein the roller bearings are arranged in a plurality of rows, and each row of the roller bearings is held individually by the case.

14. A cylindrical roller bearing comprising: an inner ring; an outer ring; a plurality of cylindrical rollers arranged between the inner ring and the outer ring in a freely rollable manner; and a cage made of a synthetic resin, in which the cage comprises an annular section, a plurality of pillars extending in one axial direction from an inside surface of the annular section, and a plurality of pockets, which are formed between circumferential direction side faces of the pillars positioned adjacently in a circumferential direction, and hold the cylindrical rollers in a freely rollable manner, wherein the circumferential direction side faces of the pillars of the cage comprise a circular arc surface that follows the rolling contact surface of the cylindrical roller, and the tip end inner circumferential sections of the circumferential direction side faces comprise a roll-off section for contact with the cylindrical roller during elastic deformation of the pillar caused by centrifugal force, and this roll-off section comprises a first lubricant reservoir.

15. The cylindrical roller bearing according to claim 14, comprising a second lubricant reservoir positioned on the outer circumferential side, apart from the roll-off section.

16. The cylindrical roller bearing according to claim 15, wherein the second lubricant reservoir section is formed as a groove that extends in the axial direction.

17. The cylindrical roller bearing according to claim 16, wherein the second lubricant reservoir section is formed in a straight line, from a part way across the axial direction of the pillar to the tip.

18. The cylindrical roller bearing according to claim 17, wherein the second lubricant reservoir is formed so as to be inclined in the opposite direction to the direction of inclination of the pillars relative to the center axis that occurs when the pillars undergo outward elastic deformation due to centrifugal force.

19. The cylindrical roller bearing according to claim 18, wherein the angle of inclination of the inclined straight groove of the second lubricant reservoir is set to a value between 2 and 10 degrees.

20. The cylindrical roller bearing according to claim 18, wherein an outer circumferential edge of the first lubricant reservoir is formed at an incline in the opposite direction to the direction of inclination of the pillars relative to the center axis that occurs when centrifugal force causes the pillars to undergo outward elastic deformation.

21. The cylindrical roller bearing according to claim 20, wherein the angle of inclination of the inclined straight outer circumferential edge of the first lubricant reservoir is set to a value between 2 and 10 degrees.

22. The cylindrical roller bearing according to claim 17, wherein the second lubricant reservoir is formed such that the groove length is set to a value between 40 and 60% of the length in the axial direction of the cylindrical roller, the groove depth is set to a value between 2 and 8% of the diameter of the cylindrical roller, and the groove width is set to a value between 10 and 15% of the diameter of the cylindrical roller.

23. The cylindrical roller bearing according to claim 15, wherein the first lubricant reservoir section is formed to the inner circumferential side of a pocket PCD which passes through the center of the pocket, and the second lubricant reservoir is formed to the outer circumferential side of the pocket PCD.

24. The cylindrical roller bearing according to claim 14, wherein the roller bearings are arranged in a plurality of rows, and each row of the roller bearings is held individually by the case.

* * * * *